(12) United States Patent
Geng et al.

(10) Patent No.: US 12,706,697 B2
(45) Date of Patent: Aug. 11, 2026

(54) COMMUNICATION METHOD AND APPARATUS

(71) Applicant: HUAWEI TECHNOLOGIES CO., LTD., Shenzhen (CN)

(72) Inventors: Tingting Geng, Shanghai (CN); Le Yan, Shenzhen (CN); Yedan Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 722 days.

(21) Appl. No.: 18/070,067

(22) Filed: Nov. 28, 2022

(65) Prior Publication Data

US 2023/0092054 A1 Mar. 23, 2023

Related U.S. Application Data

(63) Continuation of application No. PCT/CN2021/094663, filed on May 19, 2021.

(30) Foreign Application Priority Data

May 30, 2020 (CN) ......................... 202010480855.4

(51) Int. Cl.
*H04L 1/1607* (2023.01)
*H04B 7/185* (2006.01)
(Continued)

(52) U.S. Cl.
CPC ....... *H04L 1/1607* (2013.01); *H04B 7/18513* (2013.01); *H04W 36/0072* (2013.01);
(Continued)

(58) Field of Classification Search
CPC . H04W 36/04; H04W 24/08; H04W 36/0072; H04W 36/00725; H04W 36/08;
(Continued)

(56) References Cited

U.S. PATENT DOCUMENTS

2017/0230104 A1 8/2017 Purkayastha et al.
2018/0091986 A1* 3/2018 Pedersen ............... H04W 36/26
2018/0332507 A1* 11/2018 Fujishiro ......... H04W 36/00692

FOREIGN PATENT DOCUMENTS

CN 103945471 A 7/2014
CN 109804666 A 5/2019
(Continued)

OTHER PUBLICATIONS

Huawei, HiSilicon, "RACH-less handover for NTN," Discussion and Decision, 3GPP TSG-RAN WG2 Meeting #105bis, Xi''an, China, Apr. 8-12, 2019, R2-1904167; 3 total pages.
(Continued)

*Primary Examiner* — Ji-Hae Yea
(74) *Attorney, Agent, or Firm* — Rimon PC

(57) ABSTRACT

A communication method and apparatus are provided. The method includes: A source network device generates and sends a first message, where the first message is for handing over a terminal device from the source network device to a target network device, the first message includes first indication information, and the first indication information indicates to perform a random access-free process and/or a handover complete message-free process in a handover process. In this way, if cell jump occurs in a source cell, the terminal device may not perform a random access process and/or not send a handover complete message in a process of handover from the source cell to a target cell. This avoids uplink congestion of the target cell caused by simultaneous
(Continued)

Source network device

Target network device

S601: First configuration information, indicating jump time of one or more cells served by the source network device, and/or cell information of a target cell to which each jump cell jumps S602: Second configuration information, indicating jump time of one or more cells served by the target network device, and/or cell information of a target cell to which each jump cell jumps S603: Third configuration information, indicating jump time of one or more neighboring cells of a cell managed by the source network device, and/or cell information of a target cell to which each neighboring cell jumps S604: Fourth configuration information, indicating jump time of one or more neighboring cells of a cell managed by the target network device, and/or cell information of a target cell to which each neighboring cell jumps handover of a plurality of UEs to the target cell, effectively reduces signaling overheads, and improves network performance of a target base station.

19 Claims, 11 Drawing Sheets

(51) Int. Cl.
*H04W 36/00* (2009.01)
*H04W 36/08* (2009.01)
*H04W 56/00* (2009.01)
*H04W 74/0833* (2024.01)

(52) U.S. Cl.
CPC ..... *H04W 36/083* (2023.05); *H04W 56/0045* (2013.01); *H04W 74/0833* (2013.01)

(58) Field of Classification Search
CPC ............... H04W 36/083; H04W 48/08; H04W 56/0045; H04W 24/02; H04W 36/0016; H04W 36/0079; H04W 36/26; H04W 74/0833; H04W 84/06; H04W 36/085; H04W 36/087; H04W 36/13; H04W 36/249; H04W 74/0836; H04W 74/0838; H04B 7/18513; H04B 7/18541; H04L 1/1607
See application file for complete search history.

(56) References Cited

FOREIGN PATENT DOCUMENTS

| | | | | | |
|---|---|---|---|---|---|
| CN | 110493833 | A | | 11/2019 | |
| CN | 110572856 | A | | 12/2019 | |
| WO | WO-2018031110 | A1 | * | 2/2018 | ............ H04W 80/04 |
| WO | 2020103664 | A1 | | 5/2020 | |
| WO | WO-2020198978 | A1 | * | 10/2020 | ........ H04W 36/0009 |
| WO | WO-2021092766 | A1 | * | 5/2021 | ........ H04W 36/0072 |

OTHER PUBLICATIONS

InterDigital Inc. (Email discussion rapporteur), “Report of Email Discussion [106#73][NR/NTN] Mobility issues and solutions,” Discussion, Decision, 3GPP RAN WG2 Meeting #107, Prague, Czech Republic, Aug. 26-Aug. 30, 2019, R2-1910961; 50 total pges.

ASUSTeK, Discussion on RACH-less configuration release. 3GPP TSG-RAN WG2 Meeting #102, Busan, Korea, May 21, 25, 2018, R2-1806918, 5 pages.

* cited by examiner

FIG. 6

COMMUNICATION METHOD AND APPARATUS

CROSS-REFERENCE TO RELATED APPLICATIONS

This application is a continuation of International Application n No. PCT/CN2021/094663, filed on May 19, 2021, which claims priority to Chinese Patent Application No. 202010480855.4, filed on May 30, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

In a 5th generation (5G) mobile communication technology system, a non-terrestrial network (NTN) is introduced. In the NTN system, a base station or a part of the base station functions may be deployed on a non-terrestrial device, for example, a high-altitude platform or a satellite, to provide seamless coverage for a terminal device. This improves reliability of a communication system.

A satellite communication system in which a base station or a part of the base station functions is deployed on a satellite is used as an example. The satellite may provide a service coverage area in a transparent forwarding mode, to be specific, the satellite receives a signal of a terrestrial network device connected to the satellite and forwards the signal to the ground, to generate a corresponding satellite cell. In the transparent forwarding mode, the satellite moves relative to the earth, and the satellite cell may also move on the ground with movement of the satellite. According to different terrestrial network devices connected to the satellite, signals forwarded by the satellite are different, and satellite cells correspondingly generated are different.

As the satellite moves, at a moment, the satellite disconnects from a source network device, and establishes a connection to a target network device. In this way, the satellite no longer forwards a cell signal of the source network device, but starts to forward a cell signal of the target network device. Therefore, in an original coverage area, a signal of a source cell suddenly disappears, and a signal of a target cell suddenly appears. In this case, it may be considered that a cell jump occurs in the source cell, and the source cell may also be referred to as a jump cell.

When the cell jump occurs, a large quantity of UEs that originally access the source cell are handed over to the target cell at the same time. In addition, the large quantity of UEs initiate random access RACH processes and send handover complete messages in the target cell at the same time. This causes uplink congestion in the target cell and generates a large quantity of signaling overheads.

SUMMARY

Embodiments of this application provide a communication method and apparatus, in a cell jump scenario, to reduce uplink congestion and signaling overheads of a target cell that are caused by cell handover, and improve radio resource utilization.

According to a first aspect, an embodiment of this application provides a communication method. The method may be performed by a source network device, or may be performed by a component (for example, a chip or a circuit) configured in the source network device. In the following descriptions of this application, an example in which the source network device performs the method is used for description. The method may include: The source network device generates a first message, where the first message is for handing over a terminal device from the source network device to a target network device, the first message includes first indication information, and the first indication information indicates to perform a random access-free process and/or a handover complete message-free process in a handover process; and the source network device sends the first message to the terminal device.

In this embodiment of this application, in a possible scenario, if a cell jump occurs in a source cell, the terminal device may perform the random access-free process and/or the handover complete message-free process in a process of handover from the source cell to a target cell. In this way, uplink congestion of the target cell caused by simultaneous handover of a plurality of UEs to the target cell may be avoided, signaling overheads may be effectively reduced, and network performance of a target base station is improved.

In a possible design of the first aspect, the method further includes: The source network device sends a first request message to the target network device, where the first request message is for requesting to hand over the terminal device to the target network device, and the first request message includes effective-time information of a handover configuration; and the source network device receives a first acknowledgment message from the target network device, where the first acknowledgment message indicates that the terminal device is allowed to be handed over to the target network device.

In a possible design of the first aspect, the effective-time information indicates a jump time of the source cell and/or appearance time of the target cell.

In a possible design of the first aspect, the first request message further includes first information, and the first information indicates that a handover cause is a cell jump.

In a possible design of the first aspect, the first acknowledgment message includes second information and/or first resource information. The second information is used by the terminal device to determine a timing advance from the terminal device to the target network device. The first resource information indicates an uplink time-frequency resource scheduled for the terminal device.

In a possible design of the first aspect, the second information indicates the timing advance from the terminal device to the target network device, or the second information indicates an offset of the timing advance from the terminal device to the target network device.

In a possible design of the first aspect, the first request message further includes one or more of the following information: third information, fourth information, and fifth information, where the third information indicates a distance between the source network device and a satellite, the fourth information indicates a timing advance from the source network device to the satellite, and the fifth information indicates a timing advance from the terminal device to the satellite.

In a possible design of the first aspect, the first message further includes one or more of the following information: the effective-time information, the second information, and the first resource information.

In a possible design of the first aspect, the method further includes: The source network device receives capability information of the terminal device, where the capability information indicates that the terminal device supports a random access process-free handover mechanism and/or a handover complete message-free handover mechanism.

In a possible design of the first aspect, the method further includes: The source network device sends first configuration information to the target network device, where the first configuration information indicates a jump time of a cell served by the source network device and a target cell to which the cell jumps; and/or the source network device receives second configuration information from the target network device, where the second configuration information indicates a jump time of a cell served by the target network device and a target cell to which the cell jumps.

In this embodiment of this application, by performing the foregoing process, the source network device may learn of specific cells that are of the target network device and that are jump cells, specific cells that are jump target cells of these jump cells, and the like. In this way, the source network device may determine whether a terminal device served by the source network device needs to be prevented from being handed over to a jump cell covered by the target network device, to avoid unnecessary contiguous handover. Similarly, the same is true for the target network device.

In a possible design of the first aspect, the method further includes: The source network device sends third configuration information to the target network device, where the third configuration information indicates a jump time of a neighboring cell of the source network device and a target cell to which the neighboring cell jumps; and/or the source network device receives fourth configuration information from the target network device, where the fourth configuration information indicates a jump time of a neighboring cell of the target network device and a target cell to which the neighboring cell jumps.

In this embodiment of this application, by performing the foregoing process, the source network device may learn of specific cells that are in neighboring cells of the target network device and that are jump cells, specific cells that are jump target cells of these jump cells, and the like. In this way, the source network device may determine whether a terminal device of the neighboring cells of the source network device needs to be prevented from being handed over to the neighboring cells of the target network device, to avoid unnecessary contiguous handover. Similarly, the same is true for the target network device.

In a possible design of the first aspect, the method further includes: The source network device receives fifth configuration information from the terminal device, where the fifth configuration information indicates whether a neighboring cell of the source cell is a jump cell, and/or indicates a jump time of the neighboring cell when the neighboring cell is a jump cell.

In this embodiment of this application, alternatively, the terminal device may report jump configuration information of the neighboring cell of the source cell, to enhance applicability of the method.

In a possible design of the first aspect, when the neighboring cell is a jump cell, the fifth configuration information further indicates a target cell to which the neighboring cell jumps.

In a possible design of the first aspect, the method further includes: The source network device sends second indication information to the terminal device, where the second indication information indicates the terminal device to report the fifth configuration information.

In this embodiment of this application, a mechanism in which a network device controls reporting of jump configuration information of a jump neighboring cell is used, so that signaling overheads caused by reporting of unnecessary neighboring cell information may be effectively avoided.

In a possible design of the first aspect, that the source network device sends a first request message to the target network device may include: The source network device sends a second request message to a core network device, and the core network device sends the first request message to the target network device based on the second request message. That the source network device receives a first acknowledgment message from the target network device includes: The source network device receives a second acknowledgment message from the core network device, where the second acknowledgment message is sent by the core network device after the core network device receives the first acknowledgment message from the target network device.

In this embodiment of this application, when there is no directly connected interface between the source network device and the target network device, interaction between the source network device and the target network device may alternatively be implemented by using an interface (for example, an NG interface or an S1 interface) between a radio access network device and a core network device, and a message or information between the source network device and the target network device is forwarded by the core network device, to complete the foregoing handover process.

According to a second aspect, an embodiment of this application provides a communication method. The method may be performed by a target network device, or may be performed by a component (for example, a chip or a circuit) configured in the target network device. In the following descriptions of this application, an example in which the target network device performs the method is used for description. The method may include: The target network device receives uplink information from a terminal device, where the uplink information is received when the terminal device performs a random access-free process and/or a handover complete message-free handover process; and after receiving the uplink information from the terminal device, the target network device determines that the terminal device successfully accesses the target network device.

In a possible design of the second aspect, the method further includes: The target network device receives a first request message from a source network device, where the first request message is for requesting to hand over the terminal device to the target network device, and the first request message includes effective-time information of a handover configuration; and the target network device sends a first acknowledgment message to the source network device, where the first acknowledgment message indicates that the terminal device is allowed to be handed over to the target network device.

In a possible design of the second aspect, the effective-time information indicates a jump time of a source cell and/or appearance time of a target cell.

In a possible design of the second aspect, the first request message further includes first information, and the first information indicates that a handover cause is a cell jump.

In a possible design of the second aspect, the first acknowledgment message includes second information and/or first resource information. The second information is used by the terminal device to determine a timing advance from the terminal device to the target network device. The first resource information indicates an uplink time-frequency resource scheduled for the terminal device.

In a possible design of the second aspect, the second information indicates the timing advance from the terminal device to the target network device, or the second information indicates an offset of the timing advance from the terminal device to the target network device.

In a possible design of the second aspect, the first request message further includes one or more of the following information: third information, fourth information, and fifth information, where the third information indicates a distance between the source network device and a satellite, the fourth information indicates a timing advance from the source network device to the satellite, and the fifth information indicates a timing advance from the terminal device to the satellite.

In a possible design of the second aspect, the uplink information is uplink data sent by the terminal device to the target network device, or feedback information sent by the terminal device to the target network device after the terminal device receives downlink data from the target network device.

In a possible design of the second aspect, the method further includes: The target network device receives first configuration information from the source network device, where the first configuration information indicates a jump time of a cell served by the source network device and a target cell to which the cell jumps; and/or the target network device sends second configuration information to the source network device, where the second configuration information indicates a jump time of a cell served by the target network device and a target cell to which the cell jumps.

In a possible design of the second aspect, the method further includes: The target network device receives third configuration information from the source network device, where the third configuration information indicates a jump time of a neighboring cell of the source network device and a target cell to which the neighboring cell jumps; and/or the target network device sends fourth configuration information to the source network device, where the fourth configuration information indicates a jump time of a neighboring cell of the target network device and a target cell to which the neighboring cell jumps.

In a possible design of the second aspect, that the target network device receives a first request message from a source network device includes: The target network device receives a second request message from a core network device, where the second request message is sent by the core network device after the core network device receives the first request message from the source network device. That the target network device sends a first acknowledgment message to the source network device includes: The target network device sends the first acknowledgment message to the core network device, and the core network device sends a second acknowledgment message to the source network device based on the first acknowledgment message.

According to a third aspect, this application provides a communication method. The method may be performed by a terminal device, or may be performed by a component (for example, a chip or a circuit) configured in the terminal device. In the following descriptions of this application, an example in which the terminal device performs the method is used for description. The method may include: The terminal device receives a first message from a source network device, where the first message is for handing over the terminal device from the source network device to a target network device, the first message includes first indication information, and the first indication information indicates to perform a random access-free process and/or a handover complete message-free process in a handover process; and the terminal device sends uplink information to the target network device.

In a possible design of the third aspect, the first message further includes one or more of the following information: effective-time information of a handover configuration, second information, and first resource information. The effective-time information indicates a jump time of a source cell and/or appearance time of a target cell. The second information is used by the terminal device to determine a timing advance from the terminal device to the target network device. The first resource information indicates an uplink time-frequency resource scheduled for the terminal device, and the uplink information is carried on the uplink time-frequency resource.

In a possible design of the third aspect, the second information indicates the timing advance from the terminal device to the target network device, or the second information indicates an offset of the timing advance from the terminal device to the target network device.

In a possible design of the third aspect, the uplink information is uplink data sent by the terminal device to the target network device, or feedback information sent by the terminal device to the target network device after the terminal device receives downlink data from the target network device.

In a possible design of the third aspect, the method further includes: The terminal device sends capability information to the source network device, where the capability information indicates that the terminal device supports a random access process-free handover mechanism and/or a handover complete message-free handover mechanism.

In a possible design of the third aspect, the method further includes: The terminal device sends fifth configuration information to the source network device, where the fifth configuration information indicates whether a neighboring cell of the source cell is a jump cell, and/or indicates a jump time of the neighboring cell when the neighboring cell is a jump cell.

In a possible design of the third aspect, when the neighboring cell is a jump cell, the fifth configuration information further indicates a target cell to which the neighboring cell jumps.

In a possible design of the third aspect, the method further includes: The terminal device receives second indication information from the source network device, where the second indication information indicates the terminal device to report the fifth configuration information.

According to a fourth aspect, an embodiment of this application provides a communication apparatus. The apparatus has a function of implementing the source network device in any one of the first aspect or the possible designs of the first aspect, or has a function of implementing the target network device in any one of the second aspect or the possible designs of the second aspect. The apparatus may be a network device, or may be a chip included in the network device. Alternatively, the communication apparatus may have a function of implementing the terminal device in any one of the third aspect or the possible designs of the third aspect. The apparatus may be a terminal device, or may be a chip included in the terminal device.

The function of the communication apparatus may be implemented by hardware, or may be implemented by hardware executing corresponding software. The hardware or the software includes one or more modules, units, or means corresponding to the foregoing function.

In a possible design, a structure of the apparatus includes a processing module and a transceiver module. The processing module is configured to support the apparatus to perform a corresponding function of the source network device in any one of the first aspect or the designs of the first aspect, a corresponding function of the target network device in any one of the second aspect or the designs of the second aspect, or a corresponding function of the terminal device in any one of the third aspect or the possible designs of the third aspect. The transceiver module is configured to support communication between the apparatus and another communication device. For example, when the apparatus is a source network device, the apparatus may send a first message to a terminal device. The communication apparatus may further include a storage module. The storage module is coupled to the processing module, and stores program instructions and data that are necessary for the apparatus. In an example, the processing module may be a processor, a communication module may be a transceiver, and the storage module may be a memory. The memory may be integrated with the processor, or may be disposed separately from the processor. This is not limited in this application.

In another possible design, the structure of the apparatus includes a processor, and may further include a memory. The processor is coupled to the memory, and may be configured to execute computer program instructions stored in the memory, to enable the apparatus to perform the method according to any one of the first aspect or the possible designs of the first aspect, the method according to any one of the second aspect or the possible designs of the second aspect, or the method according to any one of the third aspect or the possible designs of the third aspect.

Optionally, the apparatus further includes a communication interface, and the processor is coupled to the communication interface. When the apparatus is a network device or a terminal device, the communication interface may be a transceiver or an input/output interface. When the apparatus is a chip included in the network device or a chip included in the terminal device, the communication interface may be an input/output interface of the chip. Optionally, the transceiver may be a transceiver circuit, and the input/output interface may be an input/output circuit.

According to a fifth aspect, an embodiment of this application provides a chip system, including a processor, where the processor is coupled to a memory, and the memory is configured to store a program or instructions. When the program or the instructions is/are executed by the processor, the chip system is enabled to implement the method according to any one of the first aspect or the possible designs of the first aspect, the method according to any one of the second aspect or the possible designs of the second aspect, or the method according to any one of the third aspect or the possible designs of the third aspect.

Optionally, the chip system further includes an interface circuit, and the interface circuit is configured to exchange code instructions with the processor.

Optionally, there may be one or more processors in the chip system, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may alternatively be one or more memories in the chip system. The memory may be integrated with the processor, or may be disposed separately from the processor. This is not limited in this application. For example, the memory may be a non-transitory memory, for example, a read-only memory ROM. The memory and the processor may be integrated into a same chip, or may be separately disposed on different chips. A type of the memory and a manner of disposing the memory and the processor are not specifically limited in this application.

According to a sixth aspect, an embodiment of this application provides a computer-readable storage medium, storing a computer program or instructions. When the computer program or the instructions is/are executed, a computer is enabled to perform the method according to any one of the first aspect or the possible designs of the first aspect, the method according to any one of the second aspect or the possible designs of the second aspect, or the method according to any one of the third aspect or the possible designs of the third aspect.

According to a seventh aspect, an embodiment of this application provides a computer program product. When a computer reads and executes the computer program product, the computer is enabled to perform the method according to any one of the first aspect or the possible designs of the first aspect, the method according to any one of the second aspect or the possible designs of the second aspect, or the method according to any one of the third aspect or the possible designs of the third aspect.

According to an eighth aspect, an embodiment of this application provides a communication system. The communication system includes a source network device, a target network device, and at least one terminal device. Optionally, the communication system may further include a core network device.

For beneficial effects of the second aspect to the eighth aspect and the various possible designs of the second aspect to the eighth aspect, refer to corresponding descriptions in the first aspect. Details are not described herein again.

BRIEF DESCRIPTION OF DRAWINGS

FIG. 6 is a schematic flowchart of exchanging jump configuration information of managed cells and neighboring cells between a source network device and a target network device according to an embodiment of this application;

DESCRIPTION OF EMBODIMENTS

To make objectives, technical solutions, and advantages of embodiments of this application clearer, the following further describes embodiments of this application in detail with reference to the accompanying drawings.

The technical solutions of embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communication system, and a 5th generation (5G) mobile communication technology system or a new radio (NR) system, or applied to a future communication system, another similar communication system, or the like.

The technical solutions provided in embodiments of this application may be applied to a non-terrestrial network (NTN) communication system, or may be applied to a terrestrial network (TN) communication system. The NTN communication system may include a satellite communication system, a high altitude platform station (HAPS) communication system, or another non-terrestrial communication system.

Figure 1:
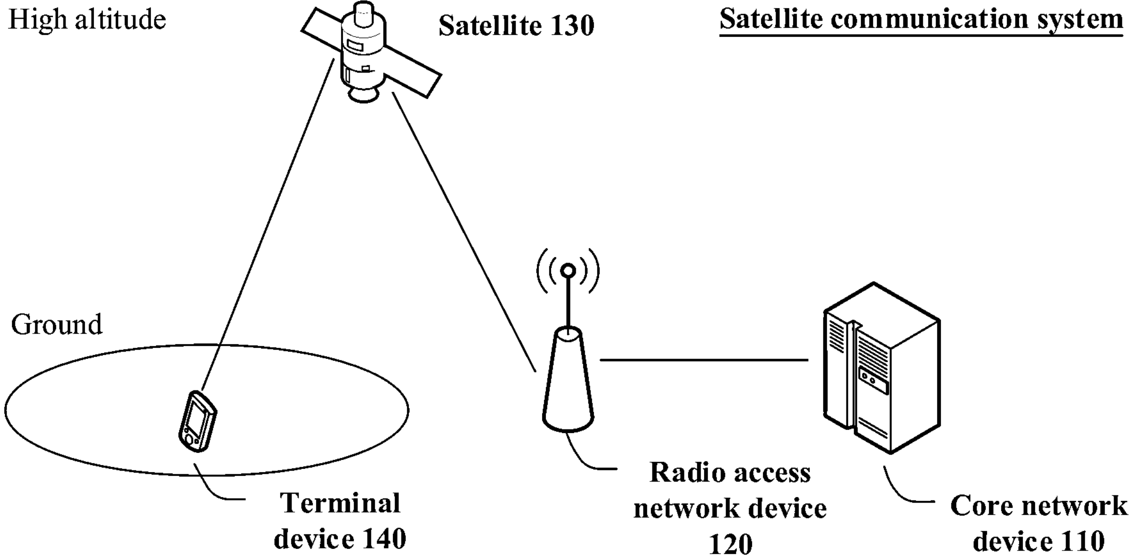
FIG. 1 is a schematic diagram of a network architecture of a satellite communication system to which an embodiment of this application is applicable.

FIG. 1 is a schematic diagram of a network architecture of a satellite communication system to which an embodiment of this application is applicable. The network architecture includes a core network device 110, a radio access network device 120, a satellite 130, and at least one terminal device (for example, a terminal device 140 shown in FIG. 1). In an example, the core network device, the radio access network device, and the terminal device in FIG. 1 are located on the ground, and the satellite is located at high altitude.

During communication between the terminal device and the radio access network device, a signal is forwarded via the satellite. To be specific, the satellite may receive a signal of the radio access network device and forward the signal to the ground to generate a satellite cell, to provide service coverage for the terminal device on the ground. In this case, the satellite is equivalent to a relay node or a forwarder. Therefore, this scenario may also be referred to as a transparent forwarding mode of the satellite. In the transparent forwarding mode, because the satellite moves relative to the ground, the satellite cell may also move on the ground with movement of the satellite. In this case, the satellite cell may be referred to as a mobile cell. Generally, a reason for generating the mobile cell is that as the satellite moves, the satellite does not dynamically adjust a beam direction. As a result, a projection of a beam generated by the satellite on the ground moves with movement of the satellite.

It should be noted that an existence scenario of the mobile cell is not specifically limited in this embodiment of this application. When the satellite provides service coverage in the transparent forwarding mode, a possible existence scenario of the mobile cell may be as follows. The satellite establishes a connection to an original radio access network device. As the satellite moves, a cell served by the original radio access network device that is forwarded by the satellite moves with the satellite for a period of time, that is, the satellite maintains the connection to the original radio access network device for a period of time. At a moment, the connection between the satellite and the original radio access network device is disconnected due to a long distance, a weak signal, or the like, and the satellite is connected to a new radio access network device. Then, the satellite starts to forward a signal of the new radio access network device, to generate a new satellite cell. It may be understood that although the satellite keeps moving, a location of the radio access network device on the ground remains unchanged. Therefore, in a scenario in which there is a mobile cell, if the satellite forwards a signal of a radio access network device on the ground, a generated satellite cell served by the radio access network device also moves in a specific range with movement of the satellite, but a movement range of the satellite cell is usually surrounding the radio access network device.

The radio access network device communicates with the core network device in a wireless or wired manner. The core network device and the radio access network device may be independent and different physical devices, or a function of the core network device and a logical function of the radio access network device may be integrated into a same physical device, or parts of functions of the core network device and parts of functions of the radio access network device may be integrated into one physical device.

It should be understood that the radio access network device described in embodiments of this application may correspond to different devices in different communication systems. For example, in a 5G system, the radio access network device corresponds to an access network device in 5G, for example, a gNB or an ng-eNB, and in a 4G system, corresponds to an access network device in 4G, for example, an eNB or an en-gNB.

Although FIG. 1 shows only one terminal device, it should be understood that one radio access network device or satellite or core network device may provide a service for one or more terminal devices. Quantities of core network devices, radio access network devices, satellites, and terminal devices included in the satellite communication system are not limited in embodiments of this application. In addition, the terminal device may be at a fixed location, or may be mobile. This is not limited in this application.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that with evolution of communication network architectures and emergence of new service scenarios, the technical solutions provided in embodiments of this application are also applicable to similar technical problems.

The following explains and describes some terms in embodiments of this application, to help a person skilled in the art have a better understanding.

(1) The terminal device in embodiments of this application is a device having a wireless transceiver function, and may be deployed on land, including an indoor device or an outdoor device, a handheld device, a wearable device, or a vehicle-mounted device, may be deployed on water (for example, on a ship), or may be deployed in the air (for example, on an airplane, a balloon, or a satellite). The terminal device may communicate with a core network through a radio access network (RAN), and exchange voice and/or data with the RAN. The terminal device may be a mobile phone, a tablet (Pad), a computer with a wireless transceiver function, a mobile internet device (MID), a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application. Sometimes, the terminal device may also be referred to as user equipment (UE), a mobile station, a remote station, or the like. A specific technology, a device form, and a name that are used by the terminal device are not limited in embodiments of this application.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-sized devices that can implement all or a part of functions without depending on smartphones, such as smart watches or smart glasses, and devices that focus on only one type of application function and need to collaboratively work with other devices such as smartphones, for example, various smart bands, smart helmets, or smart jewelry for monitoring physical signs.

The terminal device in embodiments of this application may alternatively be a vehicle-mounted module, a vehicle-mounted module assembly, a vehicle-mounted component, a vehicle-mounted chip, or a vehicle-mounted unit that is built in a vehicle as one or more components or units. The vehicle may use the vehicle-mounted module, the vehicle-mounted module assembly, the vehicle-mounted component, the vehicle-mounted chip, or the vehicle-mounted unit that is built in the vehicle to implement the method in this application.

(2) The radio access network device in embodiments of this application is a device that is in a network and that is configured to connect a terminal device to a wireless network. The radio access network device may be a node in a radio access network, or may be referred to as a base station or a RAN node. In this application, the radio access network device is a terrestrial radio access network device deployed on the ground. In the following description, the radio access network device may be referred to as a network device or a terrestrial network device for short. Unless otherwise specified, both the network device and the terrestrial network device in the following are radio access network devices, namely, radio access network devices deployed on the ground.

The network device may include an evolved NodeB (eNB, or e-NodeB, evolved NodeB) in an LTE system or an LTE-advanced (LTE-A) system, for example, a conventional macro base station eNB and a micro base station eNB in a heterogeneous network scenario; or may include a next generation NodeB (gNB) in a 5G system or an NR system; and may further include a radio network controller (RNC), a NodeB (NB), a base station controller (BSC), a base transceiver station (BTS), a transmission reception point (TRP), a home base station (for example, a home evolved NodeB or a home NodeB, HNB), a baseband unit (BBU), a baseband pool BBU pool or a wireless fidelity (Wi-Fi) access point (AP), an integrated access and backhaul (IAB) node, or the like; or may further include a central unit (CU) and/or a distributed unit (DU) in a cloud access network (CloudRAN) system. This is not limited in embodiments of this application.

For example, in a network structure, the network device may be a CU node, a DU node, or an access network device including the CU node and the DU node. Further, the CU node may be divided into a control plane (CU-CP) and a user plane (CU-UP). The CU-CP is responsible for control plane functions, and mainly includes radio resource control (RRC) and packet data convergence protocol (PDCP)-C. The PDCP-C is mainly responsible for encryption and decryption, integrity protection, data transmission, and the like of control plane data. The CU-UP is responsible for user plane functions, and mainly includes a service data adaptation protocol (SDAP) and a PDCP-U. The SDAP is mainly responsible for processing data of a core network and mapping a flow to a bearer. The PDCP-U is mainly responsible for encryption and decryption, integrity protection, header compression, sequence number maintenance, data transmission, and the like of a data plane. The CU-CP and the CU-UP may be connected through an E1 interface. The CU-CP indicates that the CU is connected to the core network through an Ng interface, and is connected to the DU through an F1-C (control plane) interface. The CU-UP is connected to the DU through an F1-U (the user plane) interface. Certainly, in another possible implementation, the PDCP-C is also on the CU-UP.

(3) The satellite in embodiments of this application is a network device located on the satellite. For ease of description, a "network device on a satellite" may be referred to as a "satellite" for short. The satellite may be a low earth orbit (LEO) satellite, a medium earth orbit satellite, or another network device moving in high altitude. Generally, satellites in a satellite communication system may be classified into a geostationary earth orbit (GEO) satellite, a low earth orbit (LEO) satellite, and a medium earth orbit satellite, based on orbital altitudes of the satellites. The geostationary earth orbit satellite may also be referred to as a stationary satellite. A moving speed of the geostationary earth orbit satellite is the same as a rotation speed of the earth. Therefore, the geostationary earth orbit satellite remains stationary relative to the ground. Correspondingly, a satellite cell generated by the geostationary earth orbit satellite is also stationary. The low earth orbit satellite may also be referred to as a near-earth orbit satellite. The low earth orbit satellite moves fast relative to the ground. Therefore, a satellite cell generated by the low earth orbit satellite may move with movement of the satellite. The medium earth orbit satellite is a satellite located at an orbital altitude between the geostationary earth orbit satellite and the low earth orbit satellite.

(4) It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, including at least one means including one, two, or more, and there is no limitation on which is included. For example, if at least one of A, B, and C is included, A, B, C, A and B, A and C, B and C, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all operations in embodiments of this application need to be performed.

The following describes the cell jump in embodiments of this application.

Embodiments of this application may be applied to a scenario in which a cell jump occurs. In a running process of a satellite, because the satellite moves relative to the ground, the satellite disconnects from an originally connected terrestrial network device, and establishes a connection to a new terrestrial network device, to generate a new satellite cell. According to different terrestrial network devices connected to the satellite, signals forwarded by the satellite are also different. Therefore, a case in which a cell jump occurs in a satellite cell exists. In embodiments of this application, that a cell jump occurs in a satellite cell may also be understood as that a cell signal forwarded by a satellite jumps, for example, a forwarded signal of a terrestrial network device suddenly disappears.

The cell jump in the satellite cell includes the following two possible jump cases.

Jump case 1: One satellite may be simultaneously connected to one or more terrestrial network devices. When the satellite changes from being connected to a terrestrial network device 1 to being connected to a terrestrial network device 2, the satellite simultaneously forwards cell signals of the terrestrial network device 1 and the terrestrial network device 2 in a subsequent period of time. However, the satellite no longer forwards a cell signal of the terrestrial network device 1 for a moment. To be specific, in an original coverage area of the satellite, a cell signal of a satellite cell served by the terrestrial network device 1 suddenly disappears, and a cell jump occurs in the satellite cell served by the terrestrial network device 1. In this case, the satellite cell served by the terrestrial network device 1 may be referred to as a jump cell.

Jump case 2: One satellite is connected only to one terrestrial network device at a time. When the satellite changes from being connected to a terrestrial network device 1 to being connected to a terrestrial network device 2, the satellite immediately forwards a signal of the terrestrial network device 2. Because the satellite disconnects from the terrestrial network device 1, the satellite no longer forwards a cell signal of the terrestrial network device 1. To be specific, in an original coverage area of the satellite, a cell signal of a satellite cell served by the terrestrial network device 1 suddenly disappears, and a cell signal of a satellite cell served by the terrestrial network device 2 suddenly appears. In this case, the satellite cell served by the terrestrial network device 1 may be referred to as a jump cell.

In embodiments of this application, the jump cell may be understood as that the cell exists dynamically, to be specific, after a moment or within a period of time, a signal of the cell does not exist or disappears in an area. Optionally, a new cell may provide communication for the original coverage area of the jump cell.

It should be understood that the foregoing jump cell is described by using an example in which cell jump occurs in a satellite cell in a satellite communication system. The technical solutions in embodiments of this application may also be applied to a TN communication system. For example, when the technical solutions are applied to the TN communication system, the jump cell may also be a cell that is closed after a moment or within a period of time based on energy saving or another reason.

Figure 2:
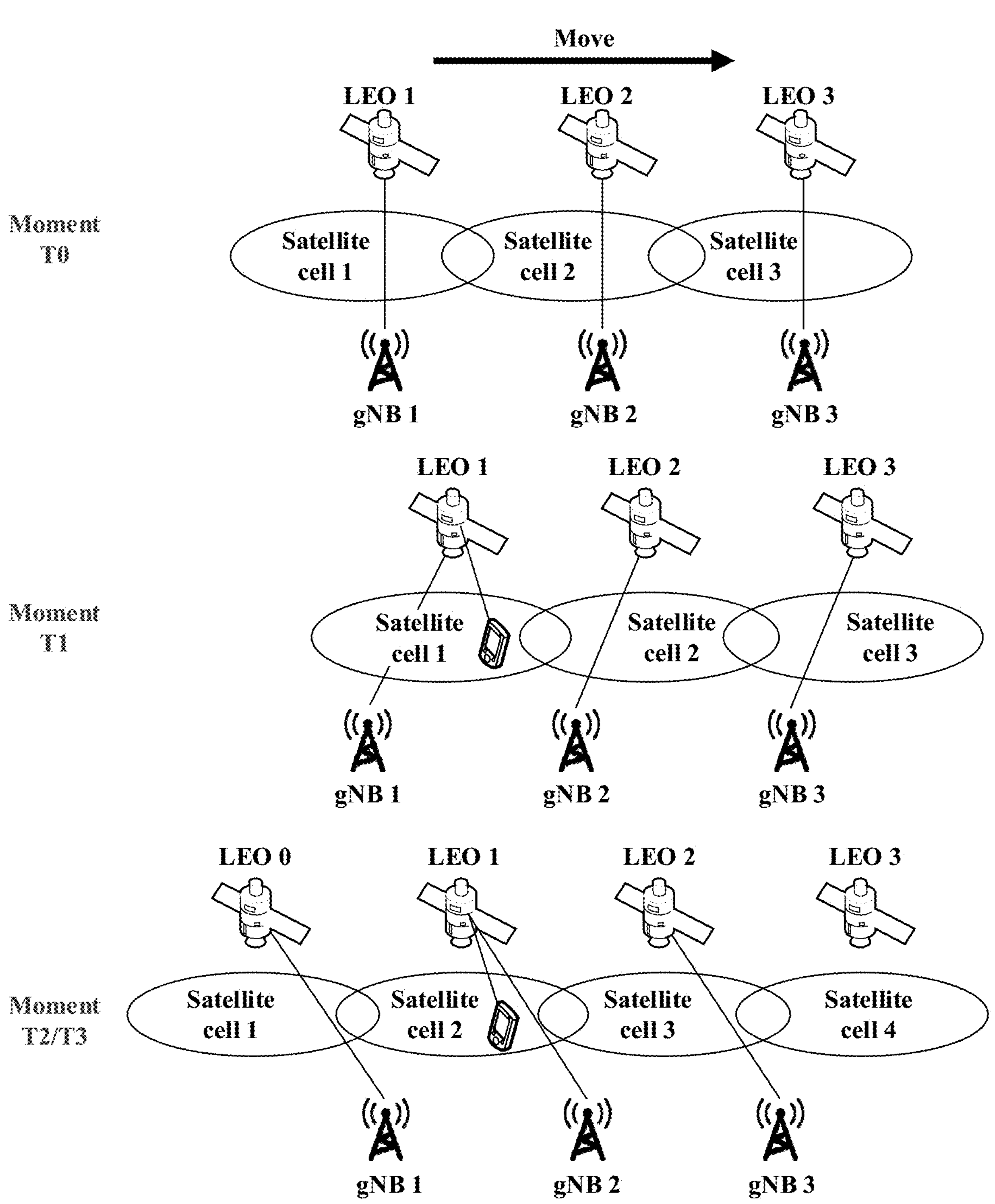
FIG. 2 is a schematic diagram of a cell jump in a satellite cell according to an embodiment of this application.

FIG. 2 is a schematic diagram of a cell jump in a satellite cell according to an embodiment of this application. In an example shown in FIG. 2, it is assumed that each satellite supports forwarding of a signal of only one terrestrial network device at a time (jump case 2), and the satellite moves in a direction from left to right. For example, in FIG. 2, a satellite 0 is an LEO 0, a satellite 1 is an LEO 1, a satellite 2 is an LEO 2, a satellite 3 is an LEO 3, a terrestrial network device 1 is a gNB 1, a terrestrial network device 2 is a gNB 2, and a terrestrial network device 3 is a gNB 3.

At a moment T0, the satellite 1 is connected to the terrestrial network device 1, and forwards a signal of a satellite cell 1 served by the terrestrial network device 1; the satellite 2 is connected to the terrestrial network device 2, and forwards a signal of a satellite cell 2 served by the terrestrial network device 2; and the satellite 3 is connected to the terrestrial network device 3, and forwards a signal of a satellite cell 3 served by the terrestrial network device 3.

At a moment T1, compared with locations at the moment T0, locations of the satellite 1, the satellite 2, and the satellite 3 move. Correspondingly, the satellite cell 1 served by the terrestrial network device 1 moves as the satellite 1 moves, the satellite cell 2 served by the terrestrial network device 2 moves as the satellite 2 moves, and the satellite cell 3 served by the terrestrial network device 3 moves as the satellite 3 moves. However, connection relationships between the satellites and the terrestrial network devices do not change, that is, no cell jump occurs in this case.

As the satellite moves rightward, at a moment T2, the satellite 1 disconnects from the terrestrial network device 1 and establishes a connection to the terrestrial network device 2 instead; the satellite 2 disconnects from the terrestrial network device 2 and establishes a connection to the terrestrial network device 3 instead; and the satellite 3 disconnects from the terrestrial network device 3, and a newly moved satellite 1 establishes a connection to the terrestrial network device 1. In other words, it may be considered that a cell jump occurs in each satellite cell at the moment T2.

At a moment T3, that is, after the cell jump occurs, the satellite 0 is connected to the terrestrial network device 1, and forwards the signal of the satellite cell 1 served by the terrestrial network device 1; the satellite 1 is connected to the terrestrial network device 2, and forwards the signal of the satellite cell 2 served by the terrestrial network device 2; and the satellite 2 is connected to the terrestrial network device 3, and forwards the signal of the satellite cell served by the terrestrial network device 3.

The foregoing cell jump process is described by using an example in which the satellite immediately establishes a connection to a new terrestrial network device after disconnecting from an originally connected terrestrial network device. It should be understood that there may alternatively be a time difference between disconnecting the satellite from the originally connected terrestrial network device and connecting the satellite to the new terrestrial network device. For example, the satellite may disconnect from the originally connected terrestrial network device at a moment T2, and then establish a connection to the new terrestrial network device at a moment T2'.

It can be learned from the example shown in FIG. 2 that areas covered by the satellite cell 1 and the satellite cell 2 before the jump are respectively covered by the satellite cell 2 and the satellite cell 3 after the cell jump occurs. To be specific, the satellite 1 jumps from being connected to the terrestrial network device 1 and forwarding the signal of the satellite cell 1 served by the terrestrial network device 1 to being connected to the terrestrial network device 2 and forwarding the signal of the satellite cell 2 served by the terrestrial network device 2; and the satellite 2 jumps from being connected to the terrestrial network device 2 and forwarding the signal of the satellite cell 2 served by the terrestrial network device 2 to being connected to the terrestrial network device 3 and forwarding the signal of the satellite cell 3 served by the terrestrial network device 3. It may be understood that, in embodiments of this application, a size of a satellite cell generated by a satellite on the ground depends on a configuration parameter of the satellite. Therefore, it may be considered that coverage areas of the satellite before and after the jump are consistent.

Because a cell jump occurs, a terminal device originally accessing a jump cell needs to perform cell handover (HO) to access a new satellite cell, to keep data transmission uninterrupted or continue previous data transmission. Although the connection between the satellite and the terrestrial network device changes before and after a satellite jump, coverage before and after the jump is consistent. Therefore, when the terrestrial network device 1 hands over the terminal device from the satellite cell 1 to the satellite cell 2, a connection between the terminal device and the satellite does not change.

In view of this, an embodiment of this application provides a communication method. The communication method is applied to a cell jump scenario to reduce uplink congestion and huge signaling overheads of a target cell that are caused because a large quantity of terminal devices in a jump cell are simultaneously handed over to a target network device, and to improve radio resource utilization.

Figure 3:
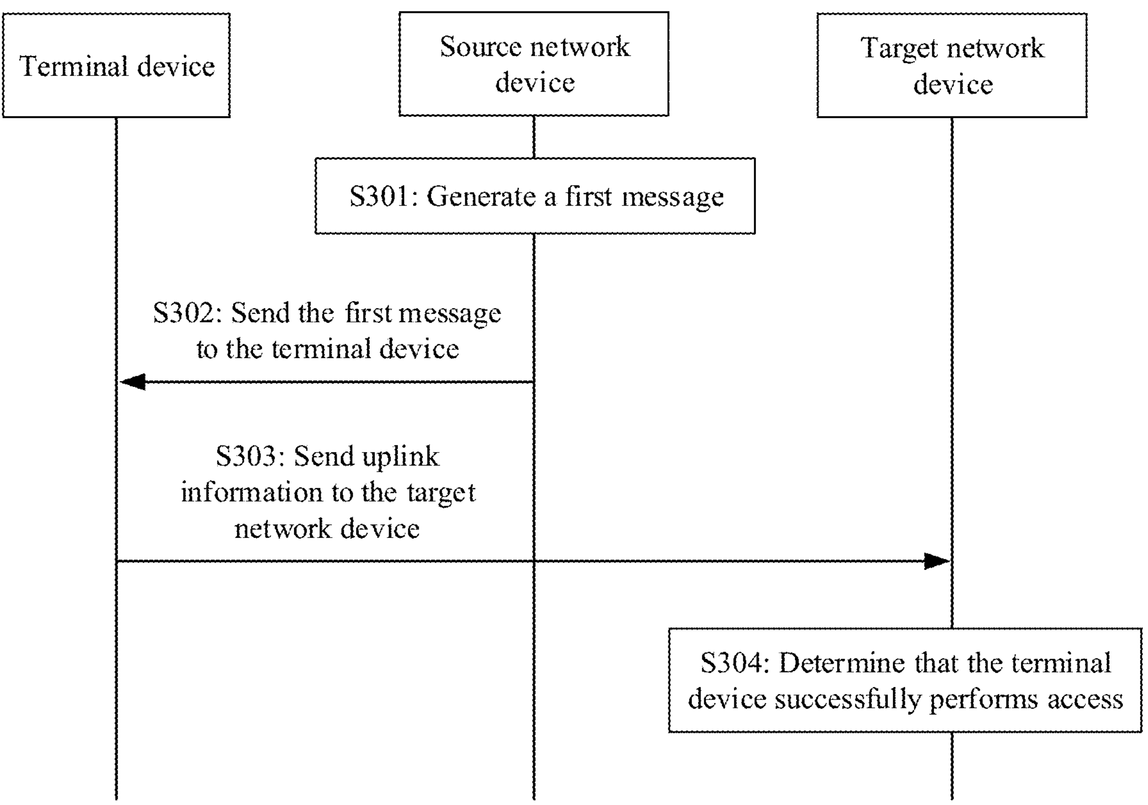
FIG. 3 is a schematic flowchart of a communication method according to an embodiment of this application.

FIG. 3 is a schematic diagram of a communication method according to an embodiment of this application. The method includes the following steps.

Step S301: A source network device generates a first message, where the first message is for handing over a terminal device from the source network device to a target network device, the first message includes first indication information, and the first indication information indicates to perform a random access-free process and/or a handover complete message-free process in a handover process.

In this embodiment of this application, the terminal device may perform handover from the source network device to the target network device. The source network device is a network device accessed by the terminal device before cell handover is performed. The target network device is a network device accessed by the terminal device after cell handover is performed. Correspondingly, a source cell is a cell accessed by the terminal device before the terminal device performs cell handover. The source cell is a cell covered by the source network device, or the source cell is a cell managed by the source network device. A target cell is a cell accessed by the terminal device after the terminal device performs cell handover. The target cell is a cell covered by the target network device, or the target cell is a cell managed by the target network device.

The terminal device may trigger the handover due to a cell jump or another reason. This is not limited in this application. In the following descriptions, an example in which the cell jump triggers the terminal device to perform the handover is used to describe the technical solutions of this application.

When the method is applied to a satellite communication system, in a scenario in which a satellite provides a service coverage area in a transparent forwarding mode and a satellite cell is a mobile cell, the source network device may alternatively be a terrestrial network device connected to the satellite before a jump, and the target network device may alternatively be a terrestrial network device connected to the satellite after the jump. Correspondingly, the source cell may alternatively be a satellite cell generated by the satellite forwarding a signal of the connected terrestrial network device before the jump. The target cell may alternatively be a satellite cell generated by the satellite forwarding a signal of the connected terrestrial network device after the jump.

The first message may be a handover command message, a reconfiguration message, or another message. This is not limited in this application. The reconfiguration message may be, for example, an RRC reconfiguration message or an RRC connection reconfiguration message.

In this embodiment of this application, performing a random access-free process in a handover process may be understood as not performing a random access process in the handover process, skipping a step of performing a random access process in the handover process, ignoring a step of performing a random access process in the handover process, or the like. Similarly, performing a handover complete message-free process in a handover process may be understood as not performing a step of sending a handover complete message in the handover process, skipping a step of sending a handover complete message in the handover process, ignoring a step of sending a handover complete message in the handover process, or the like. It should be understood that the random access-free process and the handover complete message-free process may alternatively have other similar expressions, and the expressions are not listed one by one herein in this application. The handover complete message may be, for example, an RRC reconfiguration complete message or an RRC connection reconfiguration complete message.

That the first indication information indicates to perform a random access-free process and/or a handover complete message-free process in a handover process may alternatively be understood as that the first indication information indicates to use a random access process-free handover mechanism and/or a handover complete message-free handover mechanism in the handover process. The handover mechanism may also be referred to as a handover-complete less (HO-CMP less) mechanism.

Step S302: The source network device sends the first message to the terminal device.

Correspondingly, the terminal device receives the first message from the source network device. After receiving the first message, the terminal device may determine that the first message may be executed, and may further perform handover to the target network device based on the first message. Specifically, if the first indication information indicates to perform the random access-free process in the handover process, the terminal device may not perform the random access process in a process of handover to the target network device. Optionally, the terminal device may perform only a procedure of sending the handover complete message to the target network device. If the first indication information indicates to perform the handover complete message-free process in the handover process, the terminal device may not send the handover complete message to the target network device after accessing the target network device. Optionally, the terminal device may alternatively not perform the random access process in a process of handover to the target network device. If the first indication information indicates to perform the random access-free process and the handover complete message-free process in the handover process, the terminal device may not perform the random access process in a process of handover to the target network device, and may alternatively not send the handover complete message to the target network device after accessing the target network device.

Step S303: The terminal device sends uplink information to the target network device.

It may be understood that, because the source network device indicates, via the first indication information in the first message, that the random access process does not need to be performed and/or the handover complete message does not need to be sent in the handover process, the terminal device may directly send the uplink information to the target network device, and does not need to, according to a conventional cell handover step, first perform the random access process to the target network device, after the random access process succeeds, send the handover complete message to the target network device, and then communicate with the target network device.

The uplink information may be the handover complete message sent by the terminal device to the target network device. Alternatively, the uplink information may be uplink data sent by the terminal device to the target network device, or may be feedback information sent by the terminal device to the target network device after the terminal device receives downlink data from the target network device. The feedback information may indicate whether the downlink data of the target network device is successfully received. For example, the feedback information may be an acknowledgment (ACK) or a negative acknowledgment (NACK).

Optionally, the terminal device may send the uplink information to the target network device on an uplink time-frequency resource indicated by first resource information. To be specific, the uplink information is carried on the uplink time-frequency resource indicated by the first resource information. The first resource information may be included in the first message. The source network device sends the first resource information to the terminal device via the first message. Alternatively, the first resource information may be sent by the source network device to the terminal device via another message or signaling. This is not limited in this application.

In this embodiment of this application, after the source cell jumps to disappear (for example, the jump case 2) or after the target cell jumps to appear (for example, the jump case 1), the terminal device may directly send the uplink data to the target network device on the uplink time-frequency resource indicated by the first resource information, that is, perform uplink data transmission with the target network device. In an implementation, after the terminal device receives the first message that is sent by the source network device and that indicates the terminal device to be handed over to the target network device, the terminal device may maintain data transmission with the source network device before the cell jump occurs in the source cell.

Alternatively, after the target network device sends the first acknowledgment message to the source network device, to indicate that the terminal device is allowed to be handed over to the target network device, and after the source cell jumps to disappear (for example, the jump case 2) or after the target cell jumps to appear (for example, the jump case 1), the target network device may directly send the downlink data to the terminal device. In this way, after receiving the downlink data sent by the target network device, the terminal device may send the feedback information for the downlink data to the target network device.

Correspondingly, the target network device receives the uplink information from the terminal device. The uplink information is received when the terminal device performs the random access-free process and/or a handover complete message-free handover process.

Step S304: After receiving the uplink information, the target network device determines that the terminal device successfully accesses the target network device.

Then, the target network device may further send a terminal device context release (UE context release) message to the source network device.

Figure 4:
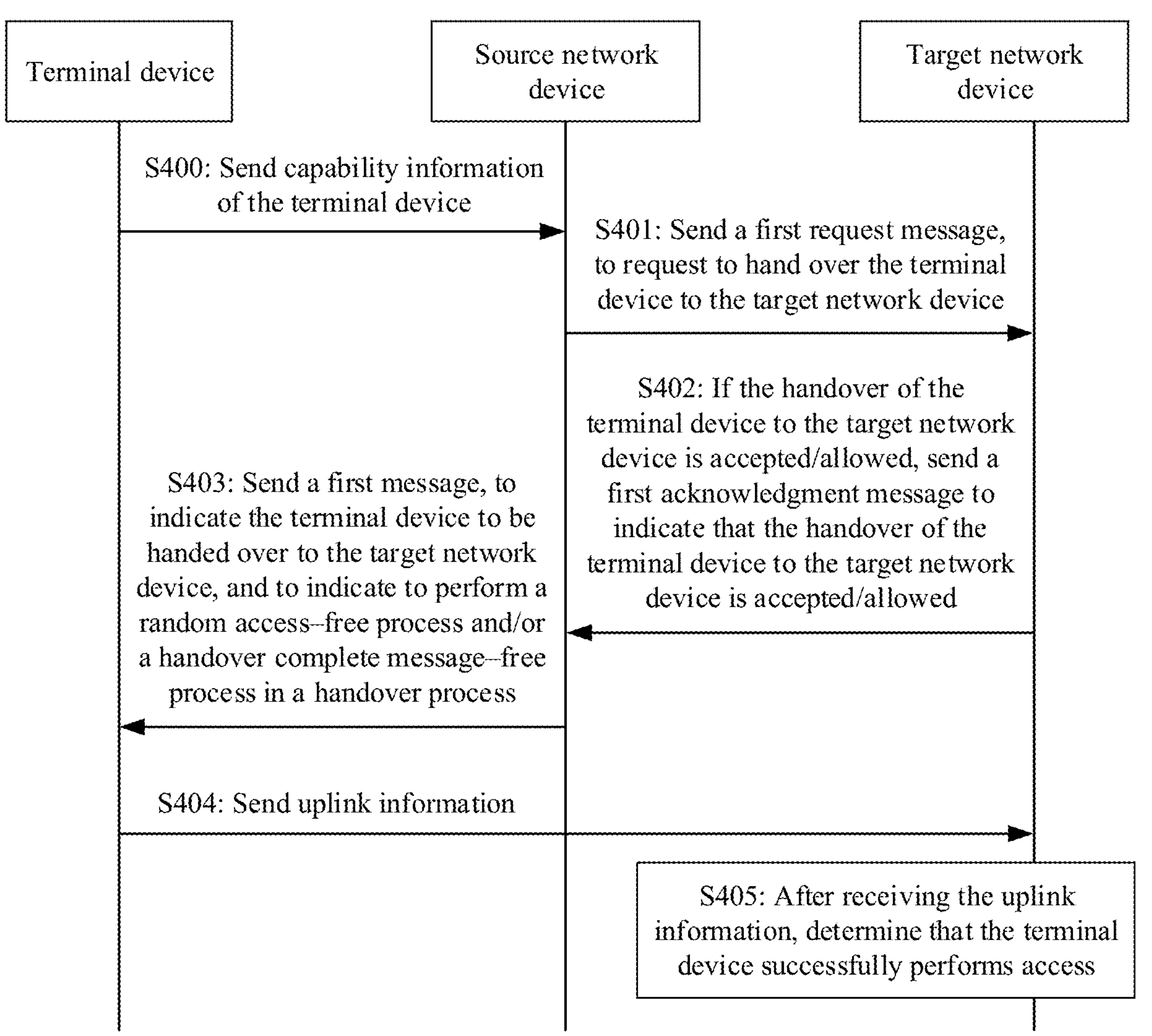
FIG. 4 is a schematic diagram of a handover procedure according to an embodiment of this application.

Optionally, the source network device and the target network device may further perform a procedure shown in FIG. 4.

Specifically, in step S400, the terminal device may send capability information of the terminal device to the source network device. The capability information indicates that the terminal device supports a random access process-free handover mechanism and/or a handover complete message-free handover mechanism, namely, the HO-CMP less mechanism.

It should be noted that step S400 is optional in the procedure shown in FIG. 4. In other words, before the source network device sends the first message to the terminal device, or before the source network device sends a first request message to the target network device, the source network device may receive the capability information of the terminal device. The capability information of the terminal device may be received by the source network device from the terminal device, or may be received by the source network device from a core network device or another network device. This is not limited in this application.

In step S401, the source network device may send the first request message to the target network device. The first request message is for requesting to hand over the terminal device to the target network device. The first request message may also be referred to as a handover request message, or has another name. This is not limited in this application.

Optionally, the first request message includes effective-time information of a handover configuration. The effective-time information indicates a jump time of the source cell and/or appearance time of the target cell. The effective-time information is used by the target network device to reserve an available handover configuration for the terminal device. The jump time of the source cell is latest time in which the source cell can provide a service. The appearance time of the target cell is earliest time in which the target cell can provide a service. The jump time of the source cell may also be referred to as a jump moment of the source cell or a disappearance moment of the source cell. The appearance time of the target cell may also be referred to as an appearance moment of the target cell.

It should be understood that the jump time of the source cell may be the same as or different from the appearance time of the target cell. For example, in jump case 1, the appearance time of the target cell may be earlier than or equal to the jump time of the source cell; and in jump case 2, the jump time of the source cell may be earlier than or equal to the appearance time of the target cell. When the jump time of the source cell is the same as the appearance time of the target cell, the effective-time information indicates only one time point. The time point is both the jump time of the source cell and the appearance time of the target cell. When the jump time of the source cell is different from the appearance time of the target cell, the effective-time information may indicate only the jump time of the source cell, or the jump time of the source cell and the appearance time of the target cell, or the appearance time of the target cell. A manner in which the effective-time information indicates the appearance time of the target cell may also be providing an offset (delta) of the appearance time of the target cell relative to the jump time of the source cell.

It should be further understood that a sequence of the jump time of the source cell and the appearance time of the target cell is not limited in this embodiment of this application. When the method is applied to a satellite communication system, in a scenario in which a satellite provides a service coverage area in a transparent forwarding mode and a satellite cell is a mobile cell, if the satellite may be simultaneously connected to a plurality of terrestrial network devices at a time, that is, in the jump case 1 described above, the appearance time of the target cell may be before the jump time of the source cell, or the appearance time of the target cell and the jump time of the source cell may be a same moment. In other words, the satellite first establishes a connection to the target network device and then disconnects from the source network device.

If the satellite is connected only to one terrestrial network device at a time, that is, in the jump case 2 described above, the appearance time of the target cell and the jump time of the source cell may be a same moment, or the appearance time of the target cell may be later than the jump time of the source cell. That the appearance time of the target cell and the jump time of the source cell are a same moment means that the satellite immediately establishes a connection to the target network device after disconnecting from the source network device. That the appearance time of the target cell is later than the jump time of the source cell means that there is a specific time difference between a time point at which the satellite disconnects from the source network device and a time point at which the satellite establishes a connection to the target network device. The satellite first disconnects from the source network device and then establishes a connection to the target network device.

The jump time of the source cell and the appearance time of the target cell may be determined by the source network device based on a moving track of the satellite or information reported by a neighboring cell. Optionally, after determining the jump time of the source cell, the source network device may perform step S401 to send the first request message to the target network device.

Optionally, the first request message may further include first information, and the first information indicates that a handover cause is a cell jump.

Optionally, the first request message may further include one or more of third information, fourth information, and fifth information. The third information indicates a distance between the source network device and the satellite. The fourth information indicates a timing advance (TA) from the source network device to the satellite. The fifth information indicates a timing advance from the terminal device to the satellite. The third information, the fourth information, and the fifth information are used by the target network device to determine a timing advance from the terminal device to the target network device, so that the terminal device accesses the target network device.

Correspondingly, the target network device may receive the first request message from the source network device.

In step S402, if the target network device accepts/allows the handover of the terminal device to the target network device, the target network device may send the first acknowledgment message to the source network device. The first acknowledgment message indicates that the handover of the terminal device to the target network device is accepted/allowed.

The first acknowledgment message may also be referred to as a handover request acknowledgment message, or may have another name. This is not limited in this application.

The first acknowledgment message includes second information and/or the first resource information. The second information is used by the terminal device to determine the timing advance from the terminal device to the target network device. For example, the second information may indicate the timing advance from the terminal device to the target network device, to be specific, a value of the timing advance from the terminal device to the target network device is directly provided. Alternatively, the second information may indicate a timing advance from the satellite to the target network device, to be specific, a value of the timing advance from the satellite to the target network device is directly provided. Alternatively, the second information may indicate an offset of the timing advance from the terminal device to the target network device. The offset may be a difference between the timing advance from the terminal device to the target network device and a timing advance from the terminal device to the source network device, or a difference between the timing advance from the satellite to the target network device and the timing advance from the satellite to the source network device.

The first resource information indicates the uplink time-frequency resource scheduled by the target network device for the terminal device. The uplink time-frequency resource is for carrying the uplink information sent by the terminal device to the target network device after determining that the terminal device can be handed over to the target network device.

In step S403, after receiving the first acknowledgment message from the target network device, the source network device may send the first message to the terminal device. For a specific implementation of step S403, refer to the descriptions in step S301 and step S302. Details are not described herein again. Optionally, the first message sent by the source network device to the terminal device may further include one or more of the effective-time information, the second information, and the first resource information. The effective-time information indicates the jump time of the source cell and/or the appearance time of the target cell. The jump time of the source cell is used by the terminal device to determine latest time in which the source network device or the source cell provides a service. The appearance time of the target cell is used by the terminal device to determine earliest time in which the target network device or the target cell provides a service.

It should be noted that content indicated by the effective-time information included in the first message may be the same as or different from content indicated by the effective-time information included in the first request message. For example, when the jump time of the source cell is the same as the appearance time of the target cell, the content indicated by the effective-time information in the first message may be the same as the content indicated by the effective-time information in the first request message. In other words, one time point is indicated, and the time point indicates both the jump time of the source cell and the appearance time of the target cell. When the jump time of the source cell is different from the appearance time of the target cell, the effective-time information in the first message may indicate only the appearance time of the target cell, or may indicate the jump time of the source cell and the appearance time of the target cell.

Further, a manner in which the effective-time information in the first message indicates the appearance time of the target cell may also be the same as or different from a manner in which the effective-time information in the first request message indicates the appearance time of the target cell. A same manner may mean that both the effective-time information in the first message and the effective-time information in the first request message directly indicate the appearance time of the target cell, or both indicate the offset of the appearance time of the target cell relative to the jump time of the source cell. Different manners may mean that one of the effective-time information in the first message and the effective-time information in the first request message directly indicates the appearance time of the target cell, and the other indicates the offset of the appearance time of the target cell relative to the jump time of the source cell.

It should be noted that content indicated by the second information included in the first message may be the same as or different from content indicated by the second information included in the first acknowledgement message. For example, when the content indicated by the second information included in the first request message is the timing advance from the terminal device to the target network device or the difference between the timing advance from the terminal device to the target network device and the timing advance from the terminal device to the source network device, the content indicated by the second information in the first message may be the same as the content indicated by the second information in the first acknowledgement message. When the content indicated by the second information included in the first acknowledgement message is the timing advance from the satellite to the target network device or a difference between the timing advance from the satellite to the target network device and the timing advance from the satellite to the source network device, the source network device may determine, based on the content indicated by the second information, the timing advance from the terminal device to the target network device or the difference between the timing advance from the terminal device to the target network device and the timing advance from the terminal device to the source network device. The second information in the first message is the timing advance from the terminal device to the target network device or the difference between the timing advance from the terminal device to the target network device and the timing advance from the terminal device to the source network device. In other words, the second information in the first message is determined based on the content indicated by the second information in the first acknowledgement message, and may be different from the content indicated by the second information in the first acknowledgement message.

In step S404, after receiving the first message from the source network device, the terminal device may send the uplink information to the target network device. For a specific implementation of step S404, refer to the descriptions in step S303. Details are not described herein again.

In step S405, after receiving the uplink information from the terminal device, the target network device may determine that the terminal device successfully accesses the target network device. For a specific implementation of step S405, refer to the descriptions in step S304. Details are not described herein again.

If the target network device does not accept/allow the handover of the terminal device to the target network device, the target network device may send a first reject message to the source network device. The first reject message indicates that the handover of the terminal device to the target network device is not accepted/allowed. The first reject message may also be referred to as a handover failure message, or may have another name. This is not limited in this application. For example, if the source network device cannot determine whether a target cell is a jump cell and performs a handover procedure, the target network device may reject the handover when the target cell is a jump cell. If the target network device allows the handover, because the target cell is also a jump cell, the terminal device performs cell handover again after being handed over to the target cell. Therefore, in this way, radio resources are wasted, and unnecessary signaling overheads are generated.

Optionally, the first reject message may further include sixth information, and the sixth information indicates a reject reason. For example, the reject reason may be a cell jump or may be that a target cell is a jump cell.

Optionally, the first reject message may further include jump configuration information. The jump configuration information may include information about a cell to which the target cell jumps, and/or jump time of the target cell. For example, the target cell is a cell A, the cell to which the target cell jumps is a cell B, and the jump time is TA-B. The jump configuration information may include information about the cell B and/or TA-B. The source network device may optimize a subsequent handover target in a timely manner based on the jump configuration information, for example, avoid handover to the target cell. Alternatively, when the terminal device reports the target cell (cell A), the source network device may adjust the handover target to the cell (for example, the cell B) to which the target cell jumps in a timely manner after the jump time (for example, TA-B).

It should be noted that when there is a directly connected interface between the source network device and the target network device, the source network device and the target network device may interact with each other through the procedure shown in FIG. 4. When there is no directly connected interface between the source network device and the target network device, interaction between the source network device and the target network device may alternatively be implemented through an interface (for example, an NG interface or an S1 interface) between a radio access network device and the core network device, and a message or information between the source network device and the target network device is forwarded via the core network device. The core network device may be an access and mobility management function (AMF), a mobility management module (mobility management entity, MME), or another network device. If the core network device is an AMF, and the interface between the radio access network device and the core network device is an NG interface, corresponding handover may also be referred to as NG interface-based handover, namely, NG based HO.

Figure 5:
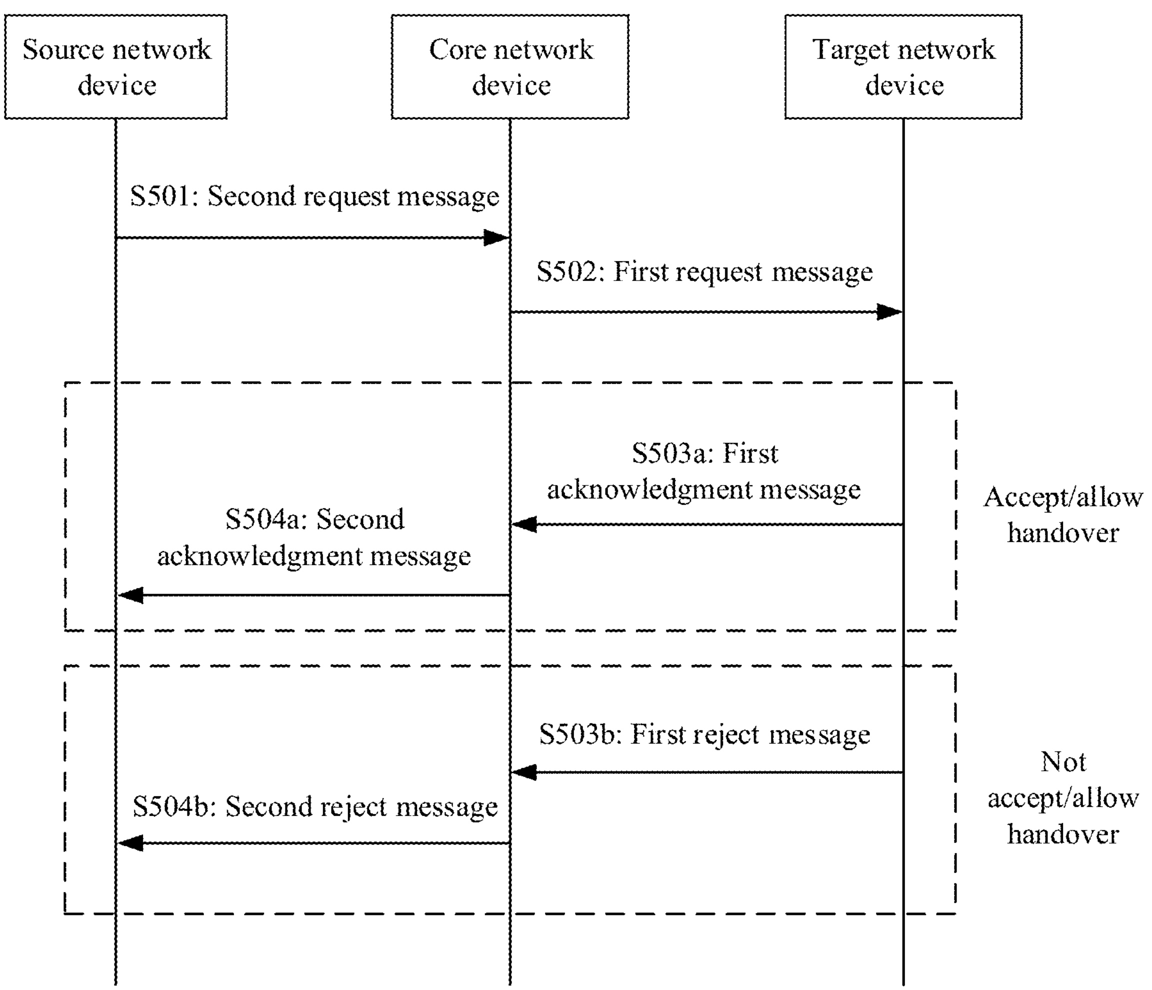
FIG. 5 is a schematic flowchart of exchanging a handover configuration between a source network device and a target network device via a core network device according to an embodiment of this application.

As shown in FIG. 5, that a source network device sends a first request message to a target network device may be divided into two parts: step S501 and step S502. In step S501, the source network device may send a second request message to a core network device. The second request message is for requesting to hand over a terminal device to the target network device. The second request message may be a handover required message, or may have another name. This is not limited in this application.

In step S502, the core network device may receive the second request message, and send the first request message to the target network device based on the second request message. As described above, the first request message may be a handover request message, or may have another name. This is not limited in this application. Handover-related configuration information carried in the first request message and handover-related configuration information carried in the second request message may be the same or partially the same. For descriptions of the handover-related configuration information, refer to the foregoing descriptions of the first request message. Details are not described herein again.

If the target network device accepts/allows the handover, in step S503*a*, the target network device may send a first acknowledgment message to the core network device. The first acknowledgment message may indicate that the handover of the terminal device to the target network device is allowed. The first acknowledgment message may be a handover request acknowledgment message, or may have another name. This is not limited in this application. Further, in step S504*a*, the core network device may receive the first acknowledgment message, and send a second acknowledgment message to the source network device. The second acknowledgment message may indicate that the source network device may hand over the terminal device to the target network device. The second acknowledgment message may be a handover command message, or may have another name. This is not limited in this application. Handover-related configuration information carried in the first acknowledgment message and handover-related configuration information carried in the second acknowledgment message may be the same or partially the same. For descriptions of the handover-related configuration information, refer to the foregoing descriptions of the first acknowledgment message. Details are not described herein again.

If the target network device does not accept/allow the handover, in step S503*b*, the target network device may send a first reject message to the core network device. The first reject message may indicate that the handover of the terminal device to the target network device is not accepted/allowed. The first reject message may be a handover failure message, or may have another name. This is not limited in this application. Further, in step S504*b*, the core network device receives the first reject message, and sends a second reject message to the source network device. The second reject message may indicate that the source network device does not hand over the terminal device to the target network device. Alternatively, the second reject message may be a handover preparation failure message, or may have another name. This is not limited in this application. Handover-related configuration information carried in the first reject message and handover-related configuration information carried in the second reject message may be the same or partially the same. For descriptions of the handover-related configuration information, refer to the foregoing descriptions of the first reject message. Details are not described herein again.

In this embodiment of this application, the first acknowledgment message and the first reject message may also be collectively referred to as a first response message. In other words, when the target network device accepts/allows the handover of the terminal device to the target network device, the first response message is specifically the first acknowledgment message; or when the target network device does not accept/allow the handover of the terminal device to the target network device, the first response message is specifically the first reject message. Similarly, the second acknowledgment message and the second reject message may also be collectively referred to as a second response message.

It should be noted that, in embodiments of this application, the technical solution described in FIG. 4 may be understood as further extension and refinement of the technical solution described in FIG. 3. Specifically, step S403 in FIG. 4 corresponds to step S302 in FIG. 3, step S404 in FIG. 4 corresponds to step S303 in FIG. 3, and step S405 in FIG. 4 corresponds to step S304 in FIG. 3. Step S400, step S401, and step S402 in FIG. 4 may be performed before step S403.

The technical solution described in FIG. 5 may be understood as a possible specific implementation of step S401 and step S402 shown in FIG. 4.

It can be learned that, based on the handover mechanism provided in this embodiment of this application, in a scenario in which a satellite provides a service coverage area in a transparent forwarding mode and a satellite cell is a mobile cell, if a cell jump occurs in a source cell, the terminal device may not perform a random access process and/or not send a handover complete message in a process of handover from the source cell to a target cell. In this way, uplink congestion of the target cell caused by simultaneous handover of a plurality of UEs to the target cell may be avoided, signaling overheads may be effectively reduced, and network performance of a target base station is improved.

Optionally, in this embodiment of this application, before the source network device determines to hand over the terminal device to the target network device, for example, before the source network device sends the first request message to the target network device in step S401, the source network device and the target network device may further exchange jump configuration information of cells managed by the source network device and the target network device, or exchange jump configuration information of cells and neighboring cells managed by the source network device and the target network device, so that the network device can sense jump configuration statuses of surrounding cells and perform more proper mobility management.

Figure 6:
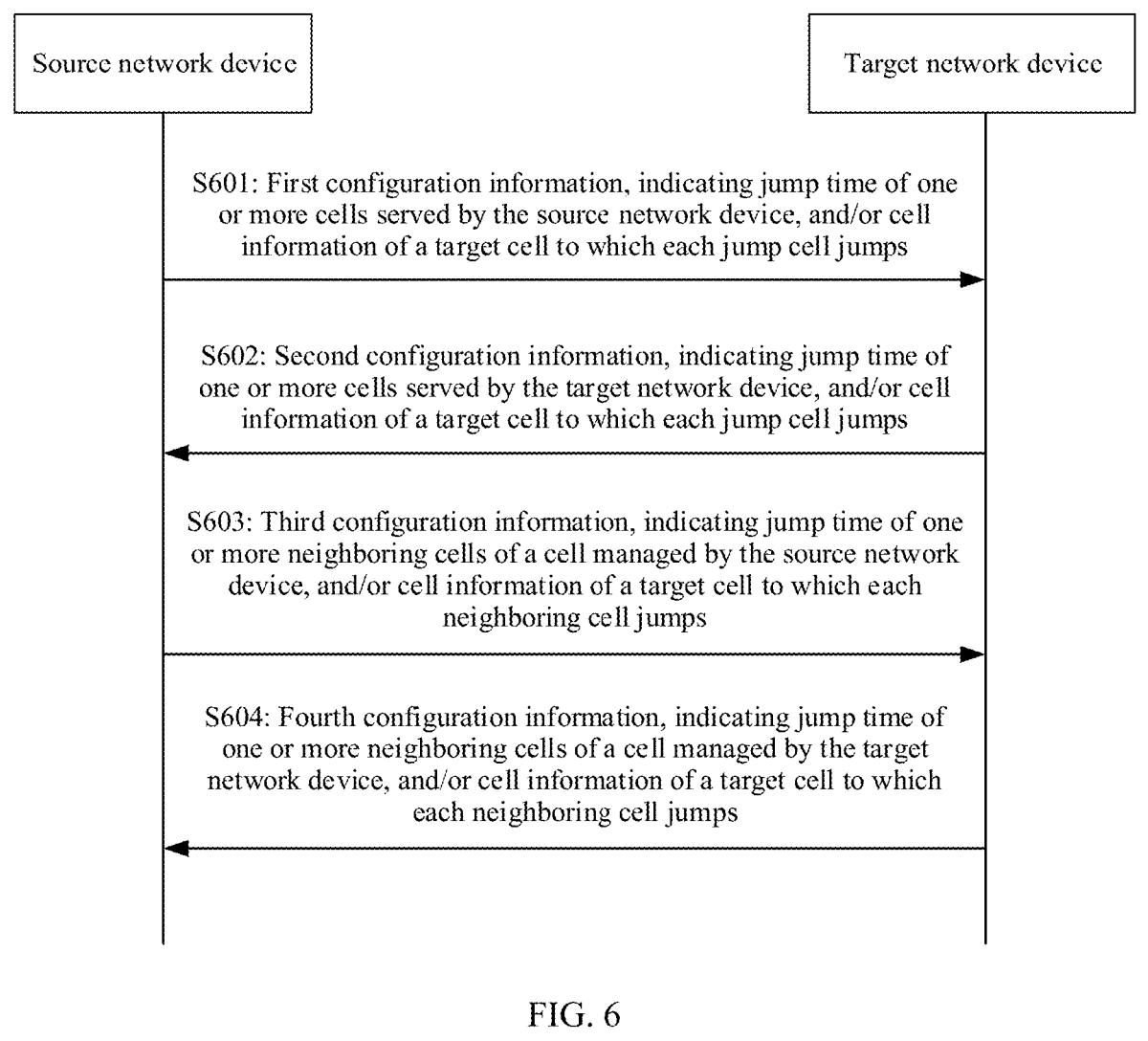

Specifically, as shown in FIG. 6, in step S601, because there is a jump cell (for example, the source cell described above) served by a source network device, the source network device may send first configuration information to a target network device. The first configuration information indicates a jump time of one or more jump cells served by the source network device, and/or cell information of a target cell to which each jump cell jumps. Correspondingly, the target network device may receive the first configuration information from the source network device. Optionally, the first configuration information may further include cell information of the one or more jump cells served by the source network device.

The cell information may include at least one of a cell global identifier (CGI), a physical cell identifier (PCI) and a frequency, a cell identifier, a non-public network identifier (NPN ID), a non-terrestrial network identifier (NTN ID), or another cell identifier of a cell. Optionally, the cell information may further include at least one of a tracking area code (TAC) and a radio access network area code (RANAC).

In step S602, if there is also a jump cell served by the target network device, the target network device may send second configuration information to the source network device. The second configuration information indicates a jump time of one or more jump cells served by the target network device, and/or cell information of a target cell to which each jump cell jumps.

Correspondingly, the source network device may receive the second configuration information from the target network device. Optionally, the second configuration information may further include cell information of the one or more jump cells served by the target network device.

According to the foregoing process, the source network device may learn of a specific cell that is served by the target network device and that is a jump cell, a specific cell that is a target cell to which the jump cell jumps, and the like. In this way, the source network device may determine whether a terminal device served by the source network device needs to be prevented from being handed over to the jump cell covered by the target network device. For example, if a cell served by the target network device is a jump cell, before jump time of the cell arrives, the source network device may prevent the terminal device from being handed over to the cell served by the target network device, that is, prevent the terminal device from being handed over to a cell in which a cell jump is to occur, to avoid unnecessary contiguous handover. Similarly, the same is true for the target network device.

Further, as shown in FIG. 6, in step S603, if there is a jump cell in one or more neighboring cells of a cell managed by the source network device, the source network device may alternatively send third configuration information to the target network device. The third configuration information indicates a jump time of the one or more neighboring cells of the cell managed by the source network device, and/or cell information of a target cell to which each neighboring cell jumps. Correspondingly, the target network device may receive the third configuration information from the source network device. Optionally, the third configuration information may further include cell information of the one or more neighboring cells of the cell managed by the source network device.

In step S604, if there is a jump cell in neighboring cells of a cell managed by the target network device, the target network device may alternatively send fourth configuration information to the source network device. The fourth configuration information indicates a jump time of one or more neighboring cells of the cell managed by the target network device, and/or cell information of a target cell to which each neighboring cell jumps. Correspondingly, the source network device may receive the fourth configuration information from the target network device. Optionally, the fourth configuration information may further include cell information of the one or more neighboring cells of the cell managed by the target network device.

According to the foregoing process, the source network device may learn of a specific cell that is in the neighboring cells of the cell managed by the target network device and that is a jump cell, a specific cell that is a target cell to which the jump cell jumps, and the like. In this way, the source network device may determine whether a terminal device managed by the source network device needs to be prevented from being handed over to a neighboring cell of the cell managed by the target network device, that is, prevent the terminal device from being handed over to a cell in which a cell jump is to occur, to avoid unnecessary contiguous handover. Similarly, the same is true for the target network device.

In a specific implementation, the source network device and the target network device may exchange one or more of the first configuration information, the second configuration information, the third configuration information, and the fourth configuration information by sending a first request and a first response. In an example, the source network device sends a first request to the target network device. The first request includes the first configuration information. After receiving the first request, the target network device may send a first response to the source network device. The first response includes the second configuration information. In another example, the target network device may send a first request to the source network device. The first request includes the second configuration information. After receiving the first request, the source network device may send a first response to the target network device. The first response includes the first configuration information.

The first request may be an interface setup request (for example, F1/X2/Xn/S1/NG setup request) message. The first response may be an interface setup response (for example, F1/X2/Xn/S1/NG setup response) message. Alternatively, the first request may be a configuration update message, and the first response may be a configuration update acknowledgment message. Specifically, the first request may be a core network node/RAN node/CU/DU configuration update message, and the first response may be a core network node/RAN node/CU/DU configuration update response message.

In another specific implementation, the source network device and the target network device may exchange one or more of the first configuration information, the second configuration information, the third configuration information, and the fourth configuration information via at least one of the following messages: a handover request message (which may be a handover request or a handover requirement), a handover request acknowledgment message, and a handover command message.

It should be noted that a sequence of performing step S601 to step S604 is not specifically limited in this application, and each of step S601 to step S604 may be independently implemented, or may be implemented in combination with one or more other steps. In other words, some or all of step S601 to step S604 may be independently implemented.

Figure 7:
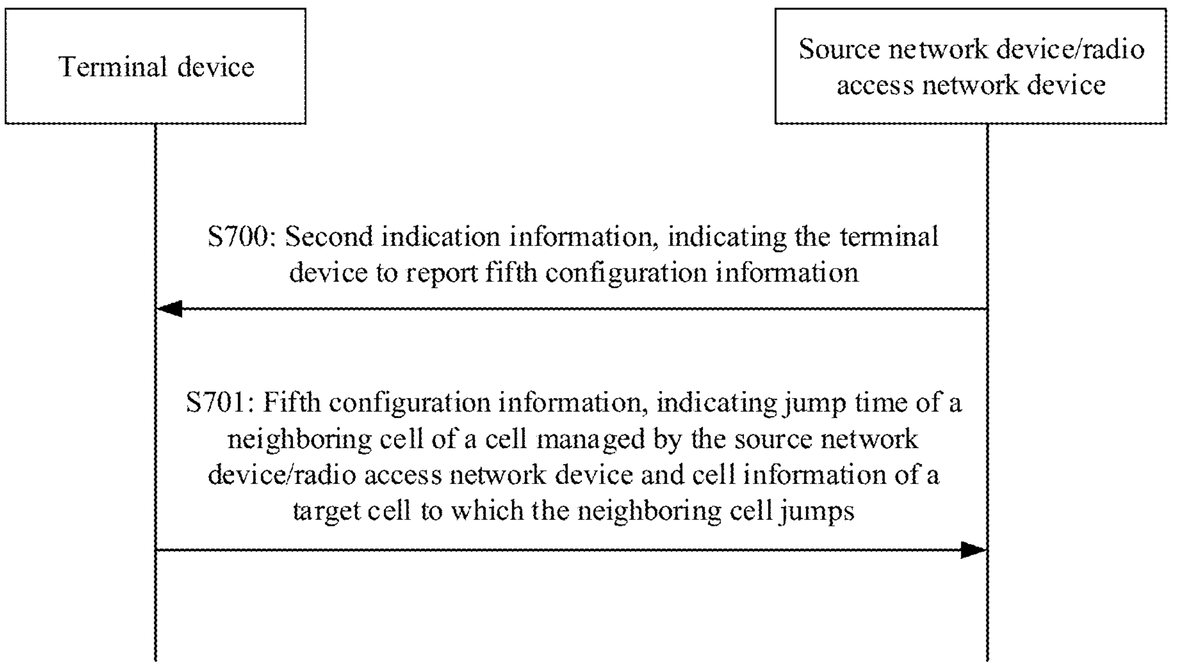
FIG. 7 is a schematic flowchart of obtaining jump configuration information of a neighboring cell from a terminal device by a source network device according to an embodiment of this application.

Optionally, in this embodiment of this application, the terminal device may alternatively report the jump configuration information of the neighboring cell of the cell managed by the source network device. Specifically, as shown in FIG. 7, if a terminal device detects that a neighboring cell of a source cell is a jump cell, in step S701, the terminal device may send fifth configuration information to a source network device. Correspondingly, the source network device may receive the fifth configuration information from the terminal device. The fifth configuration information indicates whether a neighboring cell of the source cell is a jump cell. Optionally, the fifth configuration information may include cell information of the neighboring cell. When the neighboring cell is a jump cell, the fifth configuration information may further indicate one or more of the following information: jump time of the neighboring cell, cell information of a target cell to which the neighboring cell jumps, and appearance time of the target cell.

The fifth configuration information in this embodiment of this application is cell-level. In other words, when a plurality of neighboring cells of the source cell are jump cells, the terminal device may send the fifth configuration information to each of the plurality of neighboring cells. It may be understood that, in this case, the fifth configuration information respectively corresponding to the plurality of neighboring cells may be carried in a same message/same signaling for sending, or may be sent in different messages/signaling. This is not limited in this application.

Further, before the terminal device sends the fifth configuration information, in step S700, the source network device may further send second indication information to the terminal device. The second indication information indicates the terminal device to report the fifth configuration information. Optionally, the second indication information may be cell-level, for example, may indicate the terminal device to report fifth configuration information of a specific cell. In this way, a network device controls reporting of jump configuration information of a jump neighboring cell, so that signaling overheads caused by unnecessary reporting of jump configuration information of a neighboring cell may be effectively avoided.

It should be noted that the procedure in which the terminal device reports the fifth configuration information in FIG. 7 may be implemented in combination with the handover procedures shown in FIG. 3 to FIG. 5, or may be implemented independently. When the procedure is implemented in combination with the handover procedures in FIG. 3 to FIG. 5, the source network device may send the second indication information to the terminal device before determining to hand over the terminal device to the target network device, for example, before sending the first request message to the target network device in FIG. 4, to indicate the terminal device to report the fifth configuration information. When the procedure of reporting the fifth configuration information by the terminal device in FIG. 7 is independently implemented, the source network device may be any radio access network device in a network. In other words, any radio access network device in a network may indicate a terminal device that camps on a cell of the radio access network device to report jump configuration information of a neighboring cell, and receive the reported jump configuration information of the neighboring cell from the terminal device.

Figure 8:
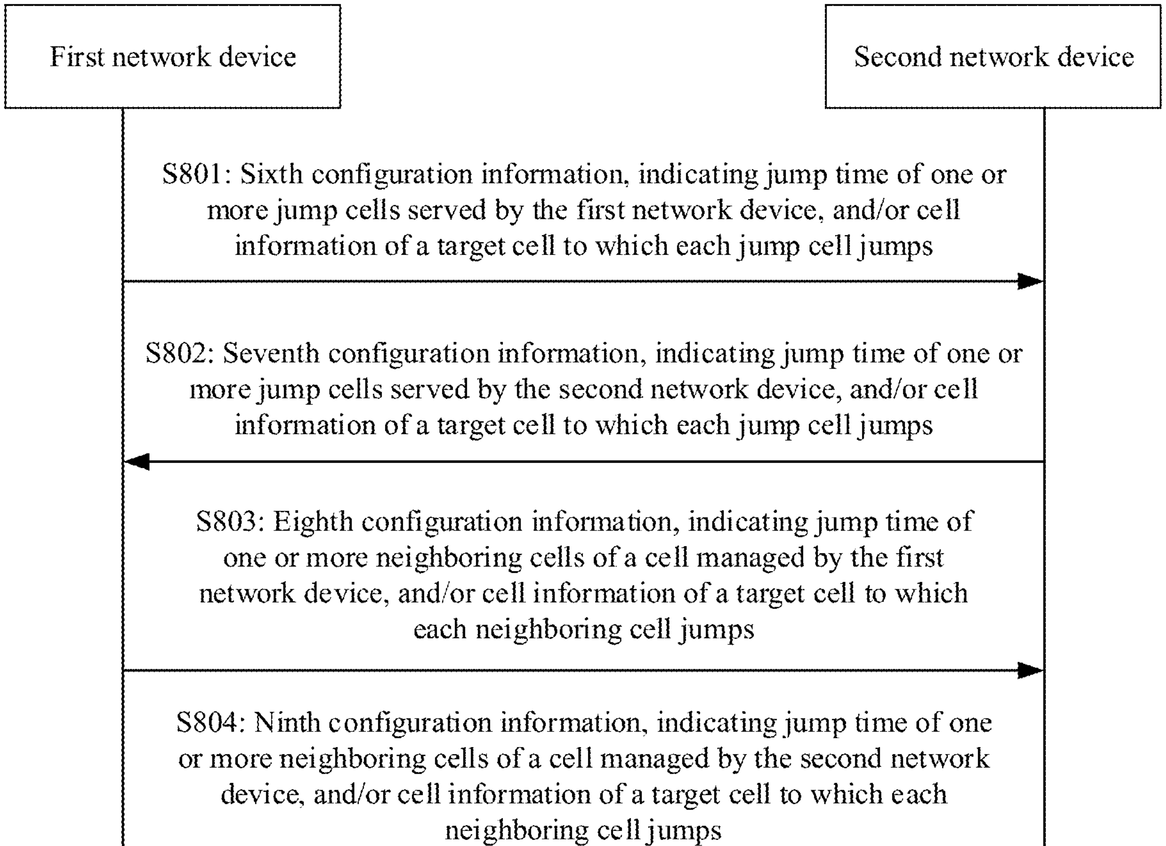
FIG. 8 is a schematic flowchart of another communication method according to an embodiment of this application.

An embodiment of this application further provides another communication method. FIG. 8 is a schematic flowchart of the another communication method. The method includes the following steps.

Step S801: A first network device sends sixth configuration information to a second network device, where the sixth configuration information indicates a jump time of one or more jump cells served by the first network device, and/or cell information of a target cell to which each jump cell jumps.

Correspondingly, the second network device may receive the sixth configuration information from the first network device.

Optionally, the sixth configuration information may further include cell information of the one or more jump cells served by the first network device.

The cell information may include at least one of a cell global identifier (CGI), a physical cell identifier (PCI) and a frequency, a cell identifier, a non-public network identifier (NPN ID), a non-terrestrial network identifier (NTN ID), or another cell identifier of a cell. Optionally, the cell information may further include at least one of a tracking area code (TAC) and a radio access network area code (RANAC).

Step S802: The second network device sends seventh configuration information to the first network device, where the seventh configuration information indicates a jump time of one or more jump cells served by the second network device, and/or cell information of a target cell to which each jump cell jumps.

Correspondingly, the first network device may receive the seventh configuration information from the second network device.

Optionally, the seventh configuration information may further include cell information of the one or more jump cells served by the second network device.

Step S803: The first network device sends eighth configuration information to the second network device, where the eighth configuration information indicates a jump time of one or more neighboring cells of a cell managed by the first network device, and/or cell information of a target cell to which each neighboring cell jumps.

Correspondingly, the second network device may receive the eighth configuration information from the first network device.

Optionally, the eighth configuration information may further include cell information of the one or more neighboring cells of the cell managed by the first network device.

Step S804: The second network device sends ninth configuration information to the first network device, where the ninth configuration information indicates a jump time of one or more neighboring cells of a cell managed by the second network device, and/or cell information of a target cell to which each neighboring cell jumps.

Correspondingly, the first network device may receive the ninth configuration information from the second network device.

Optionally, the ninth configuration information may further include cell information of the one or more neighboring cells of the cell managed by the second network device.

In this embodiment of this application, the first network device and the second network device may be two radio access network devices in a network, or CUs or DUs in the radio access network devices, or may be a radio access network device and a core network device in the network. For specific implementations of the sixth configuration information, the seventh configuration information, the eighth configuration information, and the ninth configuration information, refer to the foregoing related descriptions of the first configuration information, the second configuration information, the third configuration information, and the fourth configuration information. Details are not described herein again.

The two network devices may obtain, in the foregoing process, jump configuration information of cells managed by the two network devices, or jump configuration information of cells managed by the two network devices and jump configuration information of neighboring cells, so that the network device can sense a jump configuration status of a surrounding cell, and perform proper mobility management. For example, the terminal device may be prevented from being handed over to a cell in which a cell jump is to occur.

In a specific implementation, the first network device and the second network device may exchange one or more of the sixth configuration information, the seventh configuration information, the eighth configuration information, and the ninth configuration information by sending a first request and a first response. In an example, the first network device sends a first request to the second network device. The first request includes the sixth configuration information.

After receiving the first request, a target network device may send a first response to a source network device. The first response includes the seventh configuration information. In another example, the second network device may send a first request to the first network device. The first request includes the seventh configuration information. After receiving the first request, the first network device may send a first response to the second network device. The first response includes the sixth configuration information.

The first request may be an interface setup request (for example, X2/Xn/S1/NG setup request) message. The first response may be an interface setup response (for example, X2/Xn/S1/NG setup response) message. Alternatively, if the first network device is a CU (DU), and the second network device is a DU (CU), the first request may be an F1 interface setup request (F1 setup request) message, and the first response may be an F1 interface setup response (F1 setup response) message. Alternatively, the first request may be a configuration update message, and the first response may be a configuration update acknowledgment message. Specifically, the first request may be a core network node/RAN node/CU/DU configuration update message, and the first response may be a core network node/RAN node/CU/DU configuration update response message.

In another specific implementation, the first network device and the second network device may exchange one or more of the sixth configuration information, the seventh configuration information, the eighth configuration information, and the ninth configuration information via at least one of the following messages: a handover request message (which may be a handover request or a handover requirement), a handover request acknowledgment message, and a handover command message.

It should be noted that a sequence of performing step S801 to step S804 is not specifically limited in this application, and each of step S801 to step S804 may be independently implemented, or may be implemented in combination with one or more other steps. In other words, some or all of step S801 to step S804 may be independently implemented.

Figure 9:
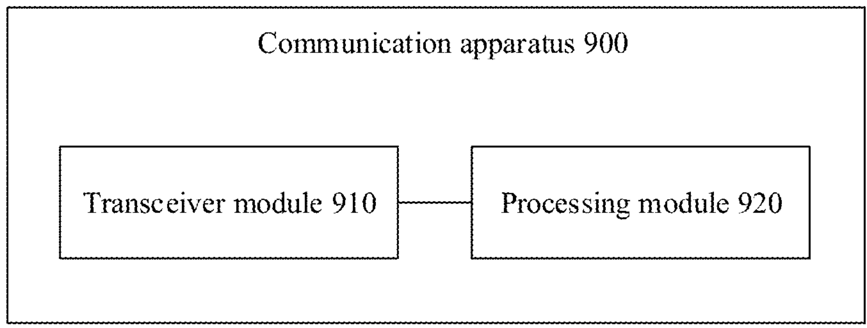
FIG. 9 is a schematic diagram of a structure of a communication apparatus according to an embodiment of this application.

An embodiment of this application provides a communication apparatus. FIG. 9 is a schematic diagram of a structure of a communication apparatus according to an embodiment of this application. The communication apparatus 900 includes a transceiver module 910 and a processing module 920. The communication apparatus may be configured to implement a function of the network device (for example, the source network device or the target network device) in any one of the foregoing method embodiments. For example, the communication apparatus may be a network device or a chip or a circuit included in the network device.

For example, when the communication apparatus performs an operation or a step corresponding to the source network device in the method embodiment shown in FIG. 3, the processing module 920 is configured to generate a first message, where the first message is for handing over a terminal device from the source network device to the target network device, the first message includes first indication information, and the first indication information indicates to perform a random access-free process and/or a handover complete message-free process in a handover process; and the transceiver module 910 is configured to send the first message to the terminal device.

In a possible design, the transceiver module 910 is further configured to send a first request message to the target network device, where the first request message is for requesting to hand over the terminal device to the target network device, and the first request message includes effective-time information of a handover configuration; and the transceiver module 910 is further configured to receive a first acknowledgment message from the target network device, where the first acknowledgment message indicates that the terminal device is allowed to be handed over to the target network device.

In a possible design, the effective-time information indicates a jump time of a source cell and/or appearance time of a target cell.

In a possible design, the first request message further includes first information, and the first information indicates that a handover cause is a cell jump.

In a possible design, the first acknowledgment message includes second information and/or first resource information. The second information is used by the terminal device to determine a timing advance from the terminal device to the target network device. The first resource information indicates an uplink time-frequency resource scheduled for the terminal device.

In a possible design, the second information indicates the timing advance from the terminal device to the target network device, or the second information indicates an offset of the timing advance from the terminal device to the target network device.

In a possible design, the first request message further includes one or more of the following information: third information, fourth information, and fifth information, where the third information indicates a distance between the source network device and a satellite, the fourth information indicates a timing advance from the source network device to the satellite, and the fifth information indicates a timing advance from the terminal device to the satellite.

In a possible design, the first message further includes one or more of the following information: the effective-time information, the second information, and the first resource information.

In a possible design, the transceiver module 910 is further configured to receive capability information of the terminal device. The capability information indicates that the terminal device supports a random access process-free handover mechanism and/or a handover complete message-free handover mechanism.

In a possible design, the transceiver module 910 is further configured to send first configuration information to the target network device, where the first configuration information indicates a jump time of a cell served by the source network device and a target cell to which the cell jumps; and/or the transceiver module 910 is further configured to receive second configuration information from the target network device, where the second configuration information indicates a jump time of a cell served by the target network device and a target cell to which the cell jumps.

In a possible design, the transceiver module 910 is further configured to send third configuration information to the target network device, where the third configuration information indicates a jump time of a neighboring cell of the source network device and a target cell to which the neighboring cell jumps; and/or the transceiver module 910 is further configured to receive fourth configuration information from the target network device, where the fourth configuration information indicates a jump time of a neighboring cell of the target network device and a target cell to which the neighboring cell jumps.

In a possible design, the transceiver module 910 is further configured to receive fifth configuration information from the terminal device. The fifth configuration information indicates whether a neighboring cell of the source cell is a jump cell, and/or indicates a jump time of the neighboring cell when the neighboring cell is a jump cell.

In a possible design, when the neighboring cell is a jump cell, the fifth configuration information further indicates a target cell to which the neighboring cell jumps.

In a possible design, the transceiver module 910 is further configured to send second indication information to the terminal device. The second indication information indicates the terminal device to report the fifth configuration information.

In a possible design, the transceiver module 910 is specifically configured to send a second request message to a core network device, and the core network device sends the first request message to the target network device based on the second request message. That the transceiver module 910 is further specifically configured to receive a first acknowledgment message from the target network device includes: The source network device receives a second acknowledgment message from the core network device, where the second acknowledgment message is sent by the core network device after the core network device receives the first acknowledgment message from the target network device.

When the communication apparatus performs an operation or a step corresponding to the target network device in the method embodiment shown in FIG. 3, the transceiver module 910 is configured to receive uplink information from a terminal device, where the uplink information is received when the terminal device performs a random access-free process and/or a handover complete message-free handover process. The processing module 920 is configured to: after the transceiver module 910 receives the uplink information from the terminal device, determine that the terminal device successfully accesses the target network device.

In a possible design, the transceiver module 910 is further configured to receive a first request message from the source network device, where the first request message is for requesting to hand over the terminal device to the target network device, and the first request message includes effective-time information of a handover configuration; and the transceiver module 910 is further configured to send a first acknowledgment message to the source network device, where the first acknowledgment message indicates that the terminal device is allowed to be handed over to the target network device.

In a possible design, the effective-time information indicates a jump time of a source cell and/or appearance time of a target cell.

In a possible design, the first request message further includes first information, and the first information indicates that a handover cause is a cell jump.

In a possible design, the first acknowledgment message includes second information and/or first resource information. The second information is used by the terminal device to determine a timing advance from the terminal device to the target network device. The first resource information indicates an uplink time-frequency resource scheduled for the terminal device.

In a possible design, the second information indicates the timing advance from the terminal device to the target network device, or the second information indicates an offset of the timing advance from the terminal device to the target network device.

In a possible design, the first request message further includes one or more of the following information: third information, fourth information, and fifth information, where the third information indicates a distance between the source network device and a satellite, the fourth information indicates a timing advance from the source network device to the satellite, and the fifth information indicates a timing advance from the terminal device to the satellite.

In a possible design, the uplink information is uplink data sent by the terminal device to the target network device, or feedback information sent by the terminal device to the target network device after the terminal device receives downlink data from the target network device.

In a possible design, the transceiver module 910 is further configured to receive first configuration information from the source network device, where the first configuration information indicates a jump time of a cell served by the source network device and a target cell to which the cell jumps; and/or the transceiver module 910 is further configured to send second configuration information to the source network device, where the second configuration information indicates a jump time of a cell served by the target network device and a target cell to which the cell jumps.

In a possible design, the transceiver module 910 is further configured to receive third configuration information from the source network device, where the third configuration information indicates a jump time of a neighboring cell of the source network device and a target cell to which the neighboring cell jumps; and/or the transceiver module 910 is further configured to send fourth configuration information to the source network device, where the fourth configuration information indicates a jump time of a neighboring cell of the target network device and a target cell to which the neighboring cell jumps.

In a possible design, the transceiver module 910 is specifically configured to receive a second request message from a core network device, where the second request message is sent by the core network device after the core network device receives the first request message from the source network device; and the transceiver module 910 is further specifically configured to send the first acknowledgment message to the core network device, and the core network device sends a second acknowledgment message to the source network device based on the first acknowledgment message.

The processing module 920 in the communication apparatus may be implemented by at least one processor or a processor-related circuit component, and the transceiver module 910 may be implemented by at least one transceiver, a transceiver-related circuit component, or a communication interface. Operations and/or functions of the modules in the communication apparatus are separately used to implement corresponding procedures of the method shown in FIG. 3, FIG. 4, FIG. 5, FIG. 6, or FIG. 7. For brevity, details are not described herein again. Optionally, the communication apparatus may further include a storage module. The storage module may be configured to store data and/or instructions. The transceiver module 910 and/or the processing module 920 may read the data and/or the instructions in the storage module, to enable the communication apparatus to implement a corresponding method. The storage module may be implemented, for example, by using at least one memory.

The storage module, the processing module, and the transceiver module may exist separately, or all or some of the modules may be integrated. For example, the storage module and the processing module are integrated, or the processing module and the transceiver module are integrated.

Figure 10:
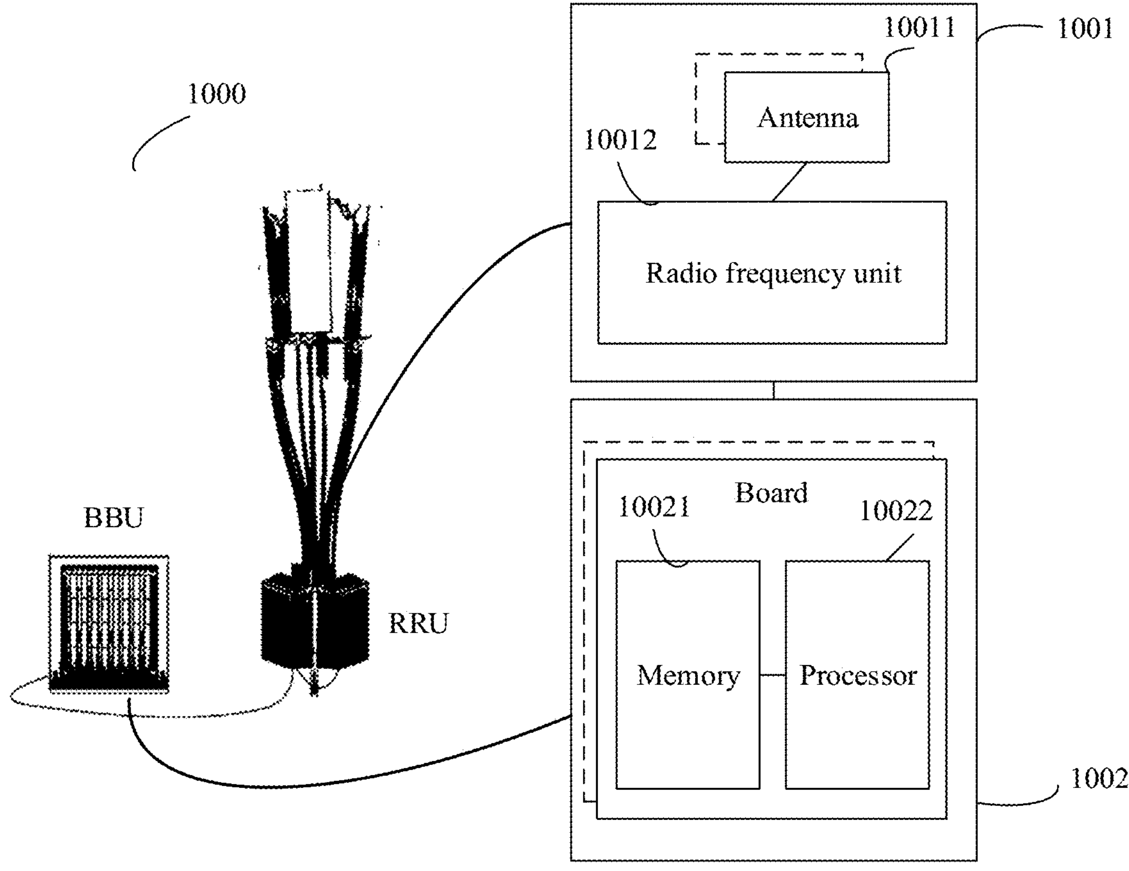
FIG. 10 is a schematic diagram of another structure of a communication apparatus according to an embodiment of this application.

FIG. 10 is a schematic diagram of another structure of a communication apparatus according to an embodiment of this application. The communication apparatus may be specifically a network device, for example, a base station, and is configured to implement a function of the network device (for example, the source network device or the target network device) in any one of the foregoing method embodiments.

The network device 1000 includes one or more radio frequency units, for example, a remote radio unit (RRU) 1001 and one or more baseband units (BBUs) (which may also be referred to as digital units, DUs) 1002. The RRU 1001 may be referred to as a transceiver unit, a transceiver machine, a transceiver circuit, a transceiver, or the like, and may include at least one antenna 10011 and a radio frequency unit 10012. The RRU 1001 is mainly configured to: receive and send a radio frequency signal and convert the radio frequency signal and a baseband signal. The BBU 1002 is mainly configured to: perform baseband processing, control the base station, and so on. The RRU 1001 and the BBU 1002 may be physically disposed together; or may be physically separately disposed, that is, in a distributed base station.

The BBU 1002, also referred to as a processing unit, is a control center of the base station, and is mainly configured to implement baseband processing functions such as channel coding, multiplexing, modulation, and spectrum spreading. For example, the BBU (the processing unit) 1002 may be configured to control the base station to perform an operation procedure related to the network device in the foregoing method embodiments.

In an example, the BBU 1002 may include one or more boards, and a plurality of boards may jointly support a radio access network (for example, an LTE network) having a single access standard, or may separately support radio access networks (for example, an LTE network, a 5G network, or another network) having different access standards. The BBU 1002 may further include a memory 10021 and a processor 10022, and the memory 10021 is configured to store necessary instructions and data. The processor 10022 is configured to control the base station to perform a necessary action, for example, is configured to control the base station to perform a sending operation in the foregoing method embodiments. The memory 10021 and the processor 10022 may serve one or more boards. In other words, a memory and a processor may be disposed on each board. Alternatively, a plurality of boards may share a same memory and a same processor. In addition, a necessary circuit may further be disposed on each board.

Figure 11:
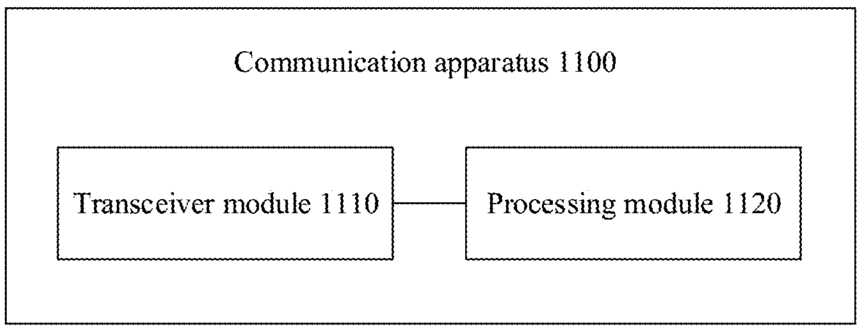
FIG. 11 is a schematic diagram of a structure of another communication apparatus according to an embodiment of this application.

An embodiment of this application further provides another communication apparatus. FIG. 11 is a schematic diagram of a structure of a communication apparatus according to an embodiment of this application. The communication apparatus 1100 includes a transceiver module 1110 and a processing module 1120. The communication apparatus may be configured to implement functions of the terminal device in any one of the foregoing method embodiments. For example, the communication apparatus may be a terminal device, for example, a handheld terminal device or a vehicle-mounted terminal device. Alternatively, the communication apparatus may be a chip or a circuit included in the terminal device, or an apparatus including the terminal device, for example, various types of vehicles.

For example, when the communication apparatus performs the method embodiment shown in FIG. 3, the transceiver module 1110 is configured to receive a first message from a source network device. The first message is for handing over a terminal device from the source network device to a target network device. The first message includes first indication information. The first indication information indicates to perform a random access-free process and/or a handover complete message-free process in a handover process. The processing module 1120 is configured to send uplink information to the target network device via the transceiver module 1110.

In a possible design, the first message further includes one or more of the following information: effective-time information of a handover configuration, second information, and first resource information. The effective-time information indicates a jump time of a source cell and/or appearance time of a target cell. The second information is used by the terminal device to determine a timing advance from the terminal device to the target network device. The first resource information indicates an uplink time-frequency resource scheduled for the terminal device, and the uplink information is carried on the uplink time-frequency resource.

In a possible design, the second information indicates the timing advance from the terminal device to the target network device, or the second information indicates an offset of the timing advance from the terminal device to the target network device.

In a possible design, the uplink information is uplink data sent by the terminal device to the target network device, or feedback information sent by the terminal device to the target network device after the terminal device receives downlink data from the target network device.

In a possible design, the transceiver module is further configured to send capability information of the terminal device to the source network device. The capability information indicates that the terminal device supports a random access process-free handover mechanism and/or a handover complete message-free handover mechanism.

In a possible design, the transceiver module 1110 is further configured to send fifth configuration information to the source network device. The fifth configuration information indicates whether a neighboring cell of the source cell is a jump cell, and/or jump time of the neighboring cell when the neighboring cell is a jump cell.

In a possible design, when the neighboring cell is a jump cell, the fifth configuration information further indicates a target cell to which the neighboring cell jumps.

In a possible design, the transceiver module 1110 is further configured to receive second indication information from the source network device. The second indication information indicates the terminal device to report the fifth configuration information.

It should be understood that the processing module 1120 in the communication apparatus may be implemented by at least one processor or a processor-related circuit component, and the transceiver module 1110 may be implemented by at least one transceiver, a transceiver-related circuit component, or a communication interface. Operations and/or functions of the modules in the communication apparatus are separately used to implement corresponding procedures of the method shown in FIG. 3, FIG. 4, FIG. 5, FIG. 6, or FIG. 7. For brevity, details are not described herein again. Optionally, the communication apparatus may further include a storage module. The storage module may be configured to store data and/or instructions. The transceiver module 1110 and/or the processing module 1120 may read the data and/or the instructions in the storage module, to enable the communication apparatus to implement a corresponding method. The storage module may be implemented, for example, by using at least one memory.

The storage module, the processing module, and the transceiver module may exist separately, or all or some of the modules may be integrated. For example, the storage module and the processing module are integrated, or the processing module and the transceiver module are integrated.

Figure 12:
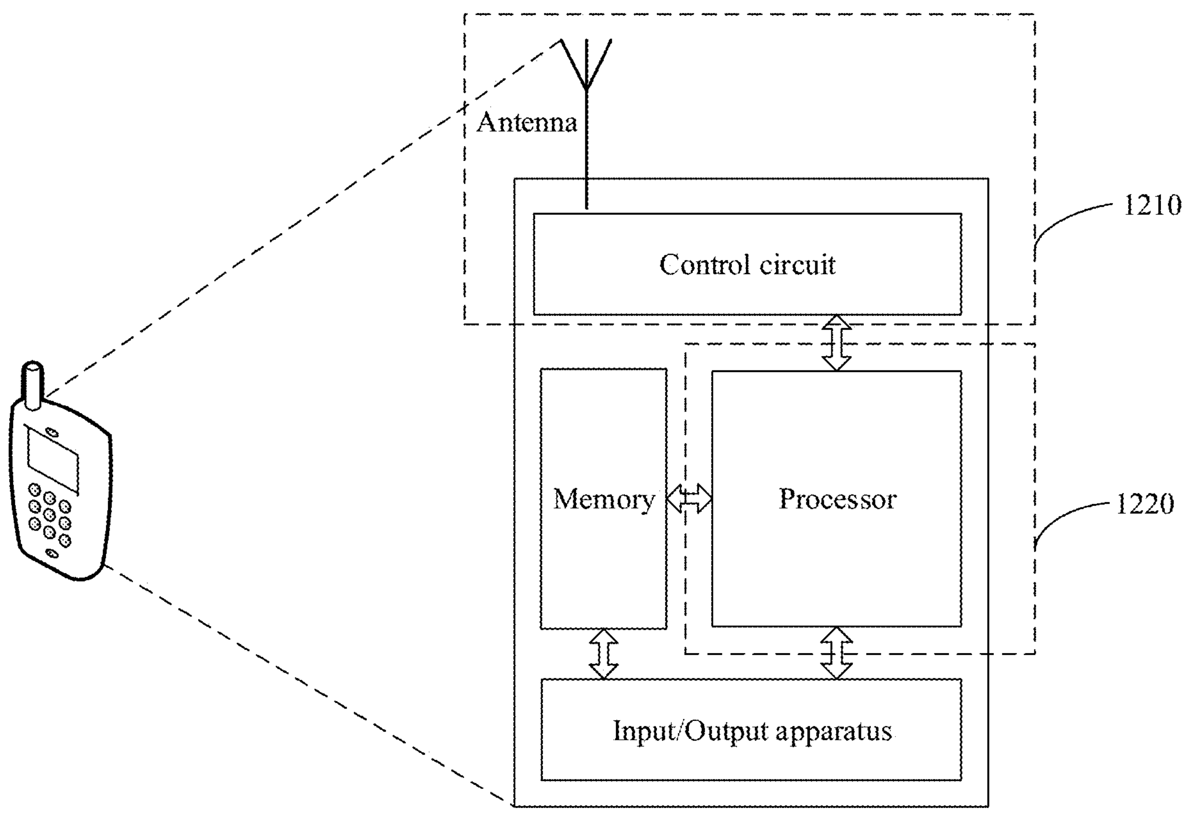
FIG. 12 is a schematic diagram of another structure of another communication apparatus according to an embodiment of this application.

FIG. 12 is a schematic diagram of another structure of a communication apparatus according to an embodiment of this application. The communication apparatus may be specifically a terminal device. The communication apparatus may be configured to implement functions of the terminal device in any one of the foregoing method embodiments. For ease of understanding and illustration, in FIG. 12, a mobile phone is used as an example of the terminal device. As shown in FIG. 12, the terminal device includes a processor, and may further include a memory. Certainly, the terminal device may further include a radio frequency circuit, an antenna, an input/output apparatus, and the like. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data entered by a user and output data to the user. It should be noted that some types of terminal devices may not have the input/output apparatus.

When data needs to be sent, the processor performs baseband processing on the to-be-sent data, and outputs a baseband signal to the radio frequency circuit. After performing radio frequency processing on the baseband signal, the radio frequency circuit sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like. It should be understood that the transceiver unit 1210 is configured to perform a sending operation and a receiving operation on a terminal device side in the foregoing method embodiments, and the processing unit 1220 is configured to perform an operation other than the receiving operation and the sending operation of the terminal device in the foregoing method embodiments.

Figure 13:
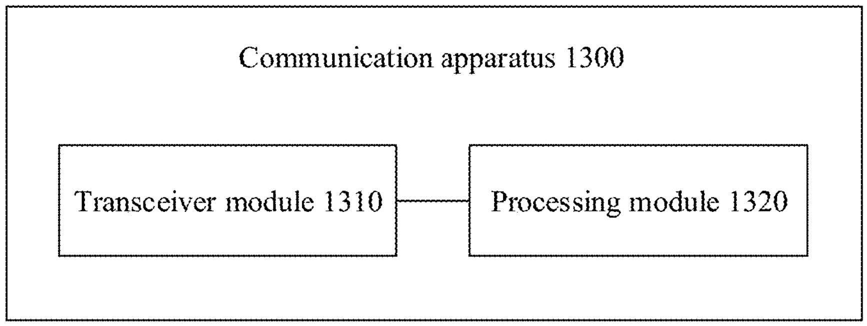
FIG. 13 is a schematic diagram of a structure of still another communication apparatus according to an embodiment of this application.

An embodiment of this application provides a communication apparatus. FIG. 13 is a schematic diagram of a structure of a communication apparatus according to an embodiment of this application. The communication apparatus 1300 includes a transceiver module 1310 and a processing module 1320. The communication apparatus may be configured to implement functions of the core network device in any one of the foregoing method embodiments. For example, the communication apparatus may be a core network device or a chip or a circuit included in the core network device.

For example, when the communication apparatus performs the method embodiment shown in FIG. 5, the transceiver module 1310 is configured to receive a second request message from a source network device. The second request message is for requesting to hand over a terminal device to a target network device. The processing module 1320 is configured to send a first request message to the target network device based on the second request message via the transceiver module 1310.

In a possible design, if the target network device allows the handover, the transceiver module 1310 is further configured to receive a first acknowledgment message from the target network device. The first acknowledgment message indicates that the handover of the terminal device to the target network device is allowed. The processing module 1320 is further configured to send a second acknowledgment message to the source network device based on the first acknowledgment message via the transceiver module 1310.

In a possible design, if the target network device does not accept the handover, the transceiver module 1310 is further configured to receive a first reject message from the target network device. The first reject message indicates that the handover of the terminal device to the target network device is not accepted/allowed. The processing module 1320 is further configured to send a second reject message to the source network device based on the first reject message via the transceiver module 1310.

It should be understood that the processing module 1320 in the communication apparatus may be implemented by at least one processor or a processor-related circuit component, and the transceiver module 1310 may be implemented by at least one transceiver, a transceiver-related circuit component, or a communication interface. Operations and/or functions of the modules in the communication apparatus are separately used to implement corresponding procedures of the method shown in FIG. 5. For brevity, details are not described herein again. Optionally, the communication apparatus may further include a storage module. The storage module may be configured to store data and/or instructions. The transceiver module 1310 and/or the processing module 1320 may read the data and/or the instructions in the storage module, to enable the communication apparatus to implement a corresponding method. The storage module may be implemented, for example, by using at least one memory.

The storage module, the processing module, and the transceiver module may exist separately, or all or some of the modules may be integrated. For example, the storage module and the processing module are integrated, or the processing module and the transceiver module are integrated.

Figure 14:
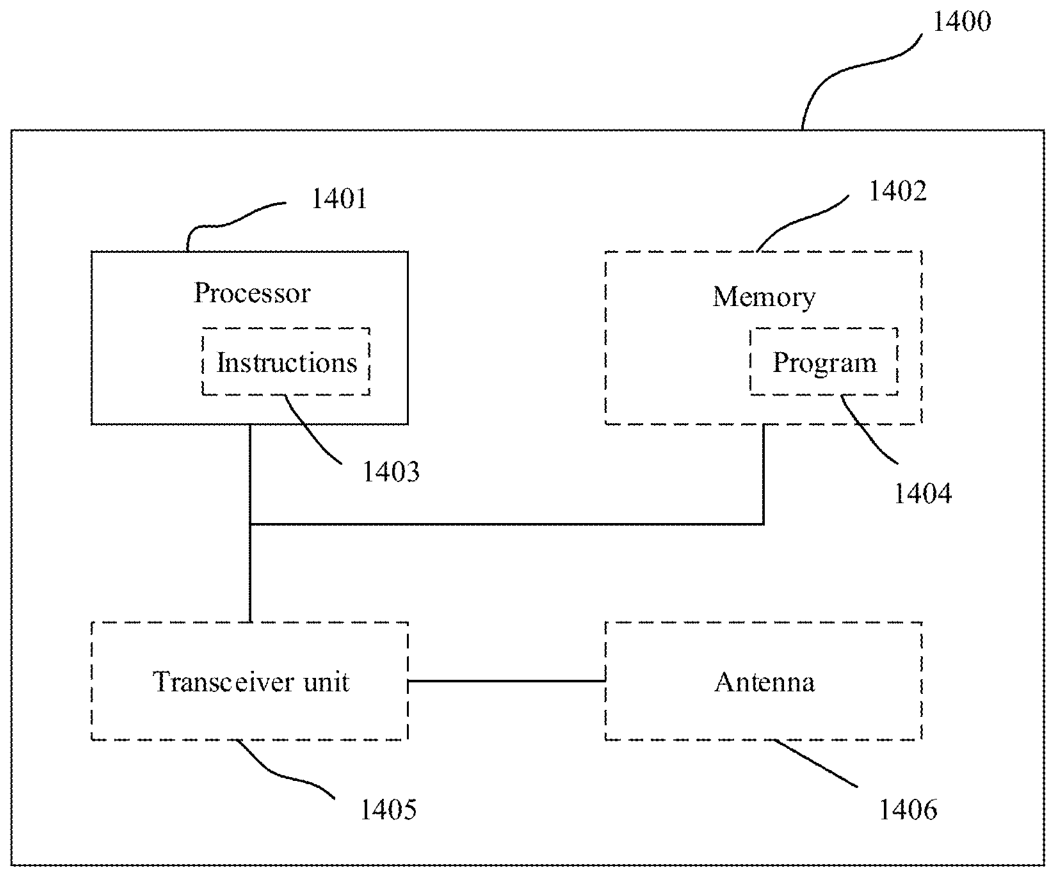
FIG. 14 is a schematic diagram of another structure of still another communication apparatus according to an embodiment of this application.

FIG. 14 is a schematic diagram of a structure of another communication apparatus according to an embodiment of this application. The communication apparatus 1400 may be configured to implement the methods performed by the core network device described in the foregoing method embodiments. The communication apparatus 1400 may be a core network device or a chip or a circuit included in the core network device.

The communication apparatus 1400 includes one or more processors 1401. The one or more processors 1401 may support the communication apparatus 1400 in implementing the method of the core network device in the foregoing method embodiments. The processor 1401 may be a general-purpose processor or a dedicated processor. For example, the processor 1401 may be a central processing unit (CPU) or a baseband processor. The baseband processor may be configured to process communication data. The CPU may be configured to control the communication apparatus (for example, the network device, a terminal device, or the chip) to execute a software program and process data of the software program. The communication apparatus 1400 may further include a transceiver unit 1405, configured to input (receive) and output (send) a signal.

For example, the communication apparatus 1400 may be a chip. The transceiver unit 1405 may be an input and/or output circuit of the chip, or the transceiver unit 1405 may be a communication interface of the chip. The chip may be used as a component of a terminal device, a network device, or another wireless communication device.

The communication apparatus 1400 may include one or more memories 1402. The memory 1402 stores a program 1404, and the program 1404 may be run by the processor 1401 to generate instructions 1403, to enable the processor 1401 to perform, according to the instructions 1403, the methods described in the foregoing method embodiments. Optionally, the memory 1402 may further store data. Optionally, the processor 1401 may further read the data stored in the memory 1402. The data and the program 1404 may be stored at a same storage address, or the data and the program 1404 may be stored at different storage addresses.

The processor 1401 and the memory 1402 may be disposed separately, or may be integrated together, for example, integrated on a board or integrated into a system-on-a-chip (SOC).

The communication apparatus 1400 may further include the transceiver unit 1405 and an antenna 1406. The transceiver unit 1405 may be referred to as a transceiver machine, a transceiver circuit, or a transceiver, and is configured to implement a transceiver function of the communication apparatus by using the antenna 1406.

An embodiment of this application further provides a chip system, including a processor, where the processor is coupled to a memory, and the memory is configured to store a program or instructions; and when the program or the instructions are executed by the processor, the chip system is enabled to implement the method corresponding to the terminal device or the method corresponding to the network device according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may alternatively be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a SoC, a CPU, a network processor (NP), a digital signal processor (DSP), a micro controller unit (MCU), a programmable controller (PLD), or another integrated chip.

It should be understood that steps in the foregoing method embodiments may be implemented by using a hardware integrated logical circuit in the processor, or by using instructions in a form of software. The steps of the method disclosed with reference to embodiments of this application may be directly performed and completed by a hardware processor, or may be performed and completed by using a combination of hardware and software modules in the processor.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a network device. The network device may include at least one of a source network device and a target network device. Further, the communication system may further include at least one terminal device. Optionally, the communication system may further include a core network device. The source network device, the target network device, the terminal device, the core network device, and the like included in the communication system may cooperate with each other to implement any one of the foregoing method embodiments. For a specific implementation of any one of the source network device and the target network device in the communication system, refer to the foregoing descriptions and descriptions of the communication apparatuses in FIG. 9 and FIG. 10. For a specific implementation of the terminal device in the communication system, refer to the foregoing descriptions and descriptions of the communication apparatuses in FIG. 11 and FIG. 12. For a specific implementation of the core network device in the communication system, refer to the foregoing descriptions and descriptions of the communication apparatuses in FIG. 13 and FIG. 14.

It should be understood that the processor mentioned in embodiments of this application may be a CPU, or may be another general-purpose processor, a DSP, an ASIC, an FPGA, another programmable logic device, a discrete gate or transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that numbers in various embodiments of this application are only used for differentiation for ease of description. Sequence numbers of the foregoing processes or steps do not mean execution sequences. The execution sequences of the processes or steps should be determined based on functions and internal logic of the processes, and should not be construed as any limitation on the implementation processes of embodiments of the present invention.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a ROM, a RAM, a magnetic disk, or an optical disc.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:

sending, to a target network device, a first request message requesting a handover of a terminal to the target network device, the first request message comprising effective-time information of a handover configuration and first information indicating that the handover is for a satellite cell jump wherein a plurality of terminals, including the terminal, are handed over at a same time from a source cell of a source network device to a target cell of the target network device; and sending a handover message, to the terminal, for handing over the terminal from the source network device to the target network device, the handover message comprising the effective-time information and indication information indicating to perform a random access-free process or a handover complete message-free process in a handover process.

2. The method according to claim 1, further comprising:

receiving a first acknowledgment message from the target network device indicating that the terminal is allowed to be handed over to the target network device.

3. The method according to claim 2, wherein the first acknowledgment message comprises second information or resource information, wherein the second information is used by the terminal to determine a timing advance from the terminal to the target network device, and the resource information indicates an uplink time-frequency resource scheduled for the terminal.

4. The method according to claim 3, wherein the second information indicates the timing advance from the terminal to the target network device, or the second information indicates an offset of the timing advance from the terminal to the target network device.

5. The method according to claim 3, wherein the handover message further comprises one or more of the second information and the resource information.

6. The method according to claim 2, wherein the first request message further comprises one or more of the following information: third information, fourth information, and fifth information, wherein the third information indicates a distance between the source network device and a satellite;

the fourth information indicates a timing advance from the source network device to the satellite; and the fifth information indicates a timing advance from the terminal to the satellite.

7. The method according to claim 2, wherein sending the first request message to the target network device comprises:

sending a second request message to a core network device to enable the core network device to send the first request message to the target network device based on the second request message; and receiving the first acknowledgment message from the target network device comprises:

receiving a second acknowledgment message from the core network device, wherein the second acknowledgment message is sent by the core network device after the core network device receives the first acknowledgment message from the target network device.

8. The method according to claim 1, wherein the effective-time information indicates a jump time of the source cell or an appearance time of the target cell.

9. The method according to claim 1, wherein the method further comprises:

receiving capability information of the terminal indicating that the terminal supports a random access process-free handover mechanism or a handover complete message-free handover mechanism.

10. A communication system comprising:

a source network device and a target network device, wherein:

the source network device being configured to send a first request message to the target network device for requesting a handover of a terminal to the target network device, the first request message comprising effective-time information of a handover configuration and first information indicating that the handover is for a satellite cell jump wherein a plurality of terminals, including the terminal, are handed over at a same time from a source cell of the source network device to the target cell of the target network device;

the source network device being further configured to send a handover message, to the terminal, for handing over the terminal from the source network device to the target network device, the handover message comprising the effective-time information and indication information indicating to perform a random access-free process or a handover complete message-free process in a handover process; and the target network device being configured to receive the first request message.

11. The communication system according to claim 10, wherein the target network device is further configured to send a first acknowledgment message to the source network device, wherein the first acknowledgment message indicates that the terminal is allowed to be handed over to the target network device.

12. The communication system according to claim 10, wherein the effective-time information indicates a jump time of the source cell or an appearance time of the target cell.

13. The communication system according to claim 10, wherein the target network device is further configured to receive uplink data sent by the terminal, or feedback information sent by the terminal after the terminal receives downlink data from the target network device.

14. The communication system according to claim 10, wherein the target network device is further configured to receive a second request message from a core network device, wherein the second request message is sent by the core network device after the core network device receives the first request message from the source network device; and to send the first acknowledgment message to the core network device.

15. A communication apparatus, comprising:

at least one processor and a transceiver, wherein the at least one processor is configured to implement program instructions in order to:

send, to a target network device, a first request message requesting a handover of a terminal to the target network device, the first request message comprising effective-time information of a handover configuration and first information indicating that the handover is for a satellite cell jump wherein a plurality of terminals, including the terminal, are handed over at a same time from a source cell of a source network device to a target cell of the target network device; and send a handover message, to the terminal, for handing over the terminal from the source network device to the target network device, the first handover message comprising first indication information indicating to perform a random access-free process or a handover complete message-free process in a handover process.

16. The communication apparatus according to claim 15, wherein the at least one processor is configured to implement the program instructions in order to further:

receive a first acknowledgment message from the target network device indicating that the terminal is allowed to be handed over to the target network device.

17. The communication apparatus according to claim 16, wherein the first acknowledgment message comprises second information or first resource information, wherein the second information is used by the terminal to determine a timing advance from the terminal to the target network device, and the first resource information indicates an uplink time-frequency resource scheduled for the terminal.

18. The communication apparatus according to claim 17, wherein the second information indicates the timing advance from the terminal to the target network device, or the second information indicates an offset of the timing advance from the terminal to the target network device.

19. The communication apparatus according to claim 15, wherein the effective-time information indicates a jump time of the source cell or an appearance time of the target cell.

* * * * *